United States Patent
Yang

(10) Patent No.: US 9,053,195 B2
(45) Date of Patent: Jun. 9, 2015

(54) METHOD AND SYSTEM FOR USER AND REFERENCE RANKING IN A DATABASE

(76) Inventor: Grant Chieh-Hsiang Yang, Sunnyvale, CA (US)

( * ) Notice: Subject to any disclaimer, the term of this patent is extended or adjusted under 35 U.S.C. 154(b) by 1504 days.

(21) Appl. No.: 11/780,438

(22) Filed: Jul. 19, 2007

(65) Prior Publication Data

US 2009/0024605 A1    Jan. 22, 2009

(51) Int. Cl.
*G06F 17/30* (2006.01)

(52) U.S. Cl.
CPC .... *G06F 17/30873* (2013.01); *G06F 17/30867* (2013.01)

(58) Field of Classification Search
CPC ......................... G06F 17/3053; G06F 17/30011
See application file for complete search history.

(56) References Cited

U.S. PATENT DOCUMENTS

| | | | |
|---|---|---|---|
| 6,012,053 A * | 1/2000 | Pant et al. ..................... | 707/3 |
| 6,925,496 B1 | 8/2005 | Ingram et al. | |
| 7,058,628 B1 | 6/2006 | Page | |
| 7,076,743 B2 | 7/2006 | Ingram et al. | |
| 7,080,073 B1 | 7/2006 | Jiang et al. | |
| 2003/0033298 A1* | 2/2003 | Sundaresan ................... | 707/5 |
| 2003/0046098 A1* | 3/2003 | Kim ............................... | 705/1 |
| 2004/0024752 A1* | 2/2004 | Manber et al. ................ | 707/3 |
| 2006/0282336 A1* | 12/2006 | Huang ........................... | 705/26 |
| 2008/0005101 A1* | 1/2008 | Chandra ........................ | 707/5 |

OTHER PUBLICATIONS

Prefound Website, http://www.prefound.com, "What is PreFound. com About?", "Why Sign Up", "What's New", "How It Works", "Prefound User Rankings", downloaded Jul. 11, 2007.
Prefound Blog, http://www.prefoundblog.com, Entries from Jul. 9, 2007 to Jan. 2006.
Jessica E. Vascellaro, "Search Engines Start Rewards Programs," The Wall Street Journal Online, Feb. 23, 2006, at http://online.wsj.com/article_email/SB114066358277980943-IMyQjAxMDE2NDIwMjYyNjlzWj.html.
Nicholas Carlson, "Searching for the Wisdom of the Crowd," Internet News, Jun. 20, 2006, at http://www.internetnews.com/infra/article.php/3614451.
Google Co-op, http://www.google.com/coop, downloaded on Jul. 11, 2007.
Dan Farber, "Powerset: The Natural Language Search Mashup Platform," ZDNet, Jun. 28, 2007, at http://blogs.zdnet.com/BTL/?p=5541.
Kyle Monson, "11 Ways to Search Without Google," Apr. 18, 2007, at http://www.pcmag.com/article2/0%2C1895%2C2115492%2C00.asp.

(Continued)

*Primary Examiner* — Yuk Ting Choi

(57) ABSTRACT

A method and system for user and reference ranking in a database or index. Users may provide reference anchors to references and those may be rated by other users. References may be rated by users and the feedback of those ratings may dynamically alter a prior user's score or ranking. The weight of a user's rating thereafter may be influenced by his score or ranking. Users or the system may create categories, which may be cross-referenced, and users may provide ratings of those categories as well. Users may also suggest search fields for categories. Feedback ratings for the search fields and categories may also affect a user's score or ranking.

20 Claims, 12 Drawing Sheets

(56) References Cited

OTHER PUBLICATIONS

Del.icio.us.com, "What is Del.icio.us?", downloaded on Jul. 11, 2007, at http://del.icio.us/about/.
James Robertson, "Deploying an effective search engine," Aug. 13, 2001, at http://www.steptwo.com.au/papers/search/index.html.
Chris Sherman, "Metacrawlers and Metasearch Engines," SearchEngineWatch.com, Mar. 23, 2005, at http://searchenginewatch.com/showPage.html?page=2156241.
Raul Valdes-Perez, "Perspective: Narrowing the search," News.com, Nov. 22, 2004, at http://news.com.com/Narrowing+the+search/2010-1038-5460452.html.
Charles Knight, "The Top 100 Alternative Search Engines," Read/WriteWeb, Jan. 29, 2007, at http://www.readwriteweb.com/archives/top_100_alternative_search_engines.php.
KartOO, Information Mapping, downloaded Jul. 7, 2007, at http://www.kartoo.net/e/eng/index.html.
Vivisimo, "products: clustering engine," downloaded Jul. 7, 2007, at http://vivisimo.com/html/clustering.
Danny Sullivan, "What is Google PageRank? A Guide for Searchers & Webmasters," SearchEngineLand, Apr. 26, 2007, at http://searchengineland.com/070426-011828.php.
"Jatalla: Community," downloaded Jul. 7, 2007, Jatalla.com, at http://jatalla.wordpress.com/faq/#whatis.
"Jatalla: Community—Effective Casting," downloaded Jul. 7, 2007, at http://jatalla.wordpress.com/effective-casting/.
"Human search engine Jatalla—Interview with Shelly Harrison," Sep. 18, 2006, at http://blog.achille.name/search-engines/human-search-engine-jatalla-interview-with-shelly-harrison/.
Mahalo website, "Mahalo FAQ," downloaded Jul. 7, 2007, at http://www.mahalo.com/Mahalo_FAQ.
Jatalla Community Blog, Jun. 20, 2006 to Jun. 2, 2007, at http://jatalla.wordpress.com/.
Terri Wells, "Bessed, A Different Approach to Human-Powered Search," Search Engine News, Mar. 13, 2007, at http://www.seochat.com/c/a/Search-Engine-News/Bessed-A-Different-Approach-to-Human-Powered-Search/.
"Human vs. Machine, Person vs. Processor: 100 Percent Brain-Powered Search Engine Offers New Paradigm," PR Web, Aug. 29, 2006, at http://www.prweb.com/releases/2006/8/prweb428158.htm.
Sproose.com, "Search and Vote Your Favorite Sites," downloaded Jul. 7, 2007, at http://www.sproose.com/pages/corporate/about.jsp.
Danny Sullivan, "How Search Engines Work," SearchEngineWatch.com, Oct. 14, 2002, at http://searchenginewatch.com/showPage.html?page=2168031.

* cited by examiner

METHOD AND SYSTEM FOR USER AND REFERENCE RANKING IN A DATABASE

With the increased capability of storing data in current computer, database, intranet, and internet systems the sizes of indexes and other methods attempting to organize the data has increased in storage size and complexity. However, despite the efforts of search engine indexes to provide relevant results, the sheer quantity and complexity of data in documents has increased faster and farther beyond the complexity and calculating powers of the best search engines. This is particularly because despite the vast computing power of even the largest and most complex server farms, the information still cannot be as readily understood in context and allocated to the appropriate search terms or placed in certain relevant categories with the accuracy of a human. Therefore, purely web-crawler based search engines today have failed to provide relevant results for search requests, requiring human users, upon a query, to spend an inordinate amount of time searching through documents returned or to repetitively alter the search query to find the desired document or reference.

Human-powered and hybrid search engines have also not fared as well in providing relevant results. Though human-powered search engines have the help of humans, one problem is that human-powered directories or search engines are only as effective as the users on the system that contribute websites, documents, or votes of the websites. Many of these human-powered search engines fail because they do not scale well, either due to lack of contributions or inability to adapt to the ever-changing data on the internet Human-powered search engines do not provide any motivation for users to contribute enough information or as frequently. Human-powered search engines also have the flaw of allowing anyone to contribute, and what one person thinks is relevant may be completely wrong to another person. In particular, human-powered search engines allow users to contribute even if they are ignorant of a topic area or subject matter. Human-powered directories also do not scale well because many require a human at the highest level to filter the content as a gatekeeper before a submitted website may actually appear in the actual search results. The gatekeeper presumably keeps out malicious users or evaluates the contributions of users, however the gatekeeper is rendered ineffective when he is ignorant of the subject matter being contributed. In fact, it may even be possible that the user has more knowledge than the gatekeeper but the gatekeeper may, out of ignorance, reject the user's good suggestions.

Many human-powered directories and search engines also fail because they are static, meaning the content, once provided does not change much in their organization in a result page. For example, the original human-powered directories were merely lists of links to documents that were static and unsorted. The order in which the directory tree and links within those trees were always presented in the same way. Other human-powered search engines may have a list of links that would be presented for a specific group or a specific search term, where the group or search term list is created by a single person or contributions of a few people. These static pages, while specifically tailored, are sometimes too narrow to be useful for a search query and the static list is typically not very useful because the relevance in relation to the query is not presented to the user. These problems are not only related to the presentation of the links, but also in how the information is collected and stored.

The limitations of a human-powered search engine are also that it requires human power to filter. It can be quite expensive for a gatekeeper to approve suggested websites or categories to be included. In addition, these gatekeepers or human editors are not always necessarily knowledgeable in the areas with which they are acting as gatekeepers. Static categories are not useful because a single website may be related to several categories and categories may have other names or synonyms. For example, a topic such as "health" could easily be "medicine," or the two topics may be created and users may redundantly be submitting websites that may be useful for one topic but is missed by users of another topic, and there is no cross-relating between those topics when a search query is performed.

The hybrid crawler/human search engines also fail because they either provide separate results from either their crawler-based index or their human-powered directory, thus not truly being hybrid and having the problems of both types of search engines previously mentioned; they do not take advantage of categorizations that have made human-powered search engines popular. Hybrid engines that allow voting also have the problem of the blind follower dilemma, wherein users who are novices to a subject matter will see popular items that happen to be on the front result page from a search query and vote those items up, solely because those items happen to be the most viewed. However, to an expert these pages may in fact be irrelevant to the actual search. The websites voted as most relevant may be irrelevant to one skilled in the topic area, and in the future those websites will continue to be given high ratings by novices in the topic area or users that simply do not search in the specific topic area frequently.

BRIEF DESCRIPTION OF THE DRAWINGS

FIG. 4d illustrates a flowchart of an example method of cross-referencing and consolidating categories in an example system of indexing, cross-referencing, and rating reference anchors and users, according to the example embodiment of the FIG. 4a.

FIG. 5b illustrates an example interface for displaying categories related to a search query, according to the example embodiment of FIG. 5a.

FIG. 5c illustrates an example interface of a menu frame for manipulating search results and contributing reference anchors, according to the example embodiment of FIG. 5a.

FIG. 5d illustrates an example interface of a menu frame for suggesting a category and contributing reference anchors, according to the example embodiment of FIG. 5a.

FIG. 5e illustrates an example interface of a frame for displaying a search results page, according to the example embodiment of FIG. 5a.

DETAILED DESCRIPTION

Figure 1:
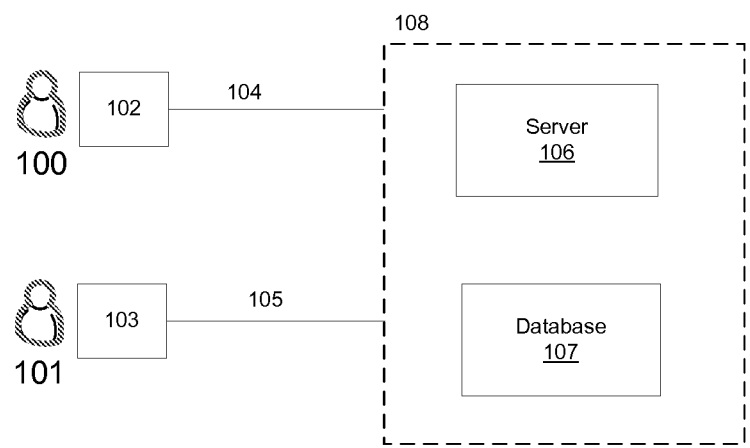
FIG. 1 illustrates a diagram of an example configuration of an example reference and user rating system, according to an example embodiment of the present invention.

Example embodiments of the present invention include systems and methods for ranking and assigning scores to documents and users. Example embodiments may allow the ranking of individual users to determine their level of expertise in an area. For example, a user may be ranked as an expert in one category, an intermediate user in another category, and a novice in another category. The level of expertise may then be used to weight an individual user's score. An individual's score, rank, or a combination of the two may be a determining factor in the weight of the individual's particular rating to a particular document. The level of expertise reflected in an individual's score may be affected by the amount of activity the user provides in altering reference anchors.

Another capability of the system is being able to score a user based on references contributed and ratings of those references provided by other users. This solves the problem of needing any human gatekeepers or a human system administrator from filtering through submissions by users or for users to become ranked users or contributors to the system. Many of the systems require a human gatekeeper to give access because there is no way to otherwise determine who may be a knowledgeable or a helpful user and who may be an incompetent or otherwise malicious user. The reference and rating system gives the user the benefit of the doubt and allows any user to contribute. The rating and reference system is protected against malicious or incompetent users, not with a human gatekeeper tediously filtering requests, but rather using a scoring and rating system that gives higher ranked users more weight in their votes and contributions and lower weight for lower or non-ranked users or otherwise unregistered users. This not only protects the results of the ratings of references, but it also provides an incentive system for users not to be malicious because if they choose poorly or with bias that does not accurately reflect the relevancy or quality of a document then other users will vote negatively on that reference anchor, in this case a rating. Negative ratings by other users in the system will ultimately impact users' scores and weights of future votes. By also ranking users within categories, not just in the overall system, the system allows a user to explore contributing to new categories without worrying too much that an exploratory choice in a contribution of a reference anchor may later negatively impact that user's high ranking in another category.

By giving significantly less weight to unregistered users, the system allows users to contribute, even without registering, but with the knowledge that their votes count for very little. Thus, there is a possibility that even a significant amount of non-registered votes may make an impact. It would be unlikely that users could coordinate with a significant amount of unregistered users. The system may prevent malicious bots from contributing as unregistered users by requiring unregistered users to submit a password from a picture along with their rating. Also, by allowing unregistered users who may not feel like registering, it still allows them to contribute, which increases the scalability of the system by receiving more entries than most system would allow.

Reference anchors may be any number of interactions that allow the system to rate the user or a reference. Reference anchors may be documents to which the user has contributed to the system, either with a link or the actual document. Reference anchors may also be a contributed category or tag. A reference anchor may also be any type of rating to which a user has provided regarding a document, category, tag, or other reference anchor. A "rating" reference anchor may not only affect the score of the reference itself, but also a prior user that rated that particular reference. A reference anchor may also be suggestions for aggregator fields for a category, as will be explained below. Reference anchor activity may be the frequency with which a user contributes or alters various stored objects in the rating system's database. Reference anchors may also be any stored object or link to an object that may affect the ranking or score of a user or a rating of the object itself.

A document may be any number of items that may be found in digital form either in an intranet or internet. For example, a document may be a webpage or website, a video or streaming video, a linked document, or any other retrievable data in digital form, particularly those that contain information that may be parsed or tokenized, such as tags or meta-tags, or any information that can be linked to or from other documents. Documents may be websites that are static (e.g. pure HTML or text pages) or websites that are dynamic or interactive (e.g. those containing javascript or flash).

Example embodiments of the present invention may store documents in a general index or associated with various topic areas (e.g. a group, category, etc.). Multiple categories may contain the same documents and multiple categories may also later be created by individual users. These categories may be crawled and cross-referenced to determine relationships between various categories. By doing so, most conceivable alternatives of categorizing a particular website or topic may be stored by the system and provide filterable results for a search query, as will be explained in more detail below. Having various categories provides a mechanism for aggregating the websites and allows searching only within that particular category. In example embodiments of the present invention users may be allowed to suggest various fields to search within a category, to provide data for those fields, and to search using those fields. This may be dynamically created by users as each category may require different fields. For example, it may be useful for a category such as "movies" to be searchable by fields such as "release date" and "actor/actress"; however, these fields would be irrelevant to a category such as "cars" which may have fields suggested such as "make" and "engine type."

Different types of documents may also be provided, and example embodiments may differentiate between the different documents by storing an indicator of the type. For example, many websites vary in the way they present information, e.g. databases, aggregators of databases, lists or indices of links, web logs ("blogs"), online stores, videos, etc. Within the various types there may be some overlap. For example, a video website may be a database of videos as well as containing individual pages. The documents may be distinguishable by type based on the features and information on the documents. For example, a database may contain a large amount of searchable information. The United States Patent Trademark Office search page may be an example document that is a database because it has a search feature that searches a giant database of patent information. An aggregator may be a search page that aggregates the database results or information of other pages. For example, many airline websites may be databases because they contain all the information regarding flight schedules and ticket information. An aggregator document may aggregate all the information from multiple airline websites to allow users to search by the same features but across many databases. A list or index may be distinguishable from a common document because though they are not in the database format they provide a large amount of information for a specialized topic. These list documents may typically contain many links and are ordered in some fashion. For example, a lyrics website may contain all song titles listed in alphabetical order and even contain a linkable alphabet at the top of the website to allow easy viewing of titles starting with a particular letter.

Determining a user's expertise in a particular topic area may allow websites or other documents to be associated with a relevant category or topic area. The opinion of an expert in a particular topic area or field may be more important to provide good resources during research than the opinions of novices in an area. On the other hand, for someone new to a topic area, while an expert's choice may be useful, it may not be the best starting point. A method of the example embodiment may apply a score or rank of the user to determine the score of a website within the category but also within a level of expertise. For example, for a novice user in a topic area website "A" may be a good beginner website to teach the novice user about the area. An expert in the area may rate website "A" poorly because while relevant, it is very basic. On the other hand, the expert may rate website "B" highly because it is useful for advanced users. The novice may conversely rate website "B" poorly because it is too difficult to understand for a novice user. By assigning different weights to different ratings based not only on the user's individual score but also the rating of the user at the time a user votes, an example embodiment of the system may be able to determine which websites are most relevant not only in the particular topic area but also for which level of user is searching within the topic area.

An example embodiment of the present invention may provide a system and method of indexing using multiple factors, such as content, relevance, and scores assigned to documents based on those factors, as well as, the ranks and/or score of users. Indexing may be performed using various example methods. For example, one method of indexing may be parsing text, meta-tags, etc. Some documents may be ranked in accordance to the relevance based on search terms, proximity of words to each other, spatial proximity, context ratings, or a combination thereof depending on the document type.

Storing of documents and an index of documents may be done through any number of methods. For example, one method may be a database, with the various tables storing the Uniform Resource Locators (URL), a cache of the web page itself, a text corpus of a document or a plurality of documents, individual indexing words and associations between the words and documents, and counters for the number of word occurrences of particular indexed words. Other storage methods of an indexing system may be an ordered tree which contains a hierarchical list of related data sets.

In example embodiments of the present invention indexing may be performed first with a large document data set and then supplemented by human-powered ratings to alter scores of the various indexed documents. Or, human users may contribute documents first to create the document data set and indexing may be performed on this subset of contributed documents. Or, in another example embodiment, the data set may grow dynamically based on the links of a document, and the indexing, whether performed by a server and web-crawler or by human contributions may be dynamic depending on the size of the system and the documents and categories created within the system.

An example embodiment may include a method and system for dynamically providing a plurality of references. The method may include identifying a plurality of documents, parsing the plurality of documents, indexing the plurality of documents, assigning a first score to each of a plurality of documents as a function of at least a rating provided by a user, and assigning a second score to each of a plurality of users as a function of the first score. A third score may also be assigned for the indexing of the plurality of documents. A score may also be assigned to the plurality of documents as a function of the first score and third score. The function of the first score may take an input of a rating of a reference anchor provided by a user. A score may be assigned to the plurality of users as a function of a user's reference anchors. Indexing of the plurality of documents may be as a function of the first score, wherein the indexing is within a plurality of categories. Re-indexing the plurality of documents may be within a plurality of categories. The rating provided by the user may be weighted as a function of a user score or a user's rank. The user's rank may be within a category. The method may receive a reference anchor from a user and dynamically alter the score of the user as a function of a score of the reference anchor. The method may recursively propagate or propagate through feedback loops the assignment of scores to the plurality of users and reference anchors as a function of ratings of reference anchors provided by other users. The reference anchor may be a document submitted by a user, a relevance vote of a document submitted by a user, a quality vote of a document submitted by a user, the submission of the document by a second user, a creation of a category, a cross-reference to a category, or the tagging of a category. The method may further determine the categories of a search query and dynamically populate a category with documents and display the documents, wherein the order of the display is a function of the score of the documents.

An example embodiment may include a method and system may of categorizing a reference anchors by identifying a plurality of categories, cross-referencing a plurality of reference anchors within the categories, and assigning a relationship score between the categories and the documents. The method and system may further assign a score to a plurality of documents within a category as a function of a reference anchor, re-structure the hierarchy of the categories and related reference anchors as a function of the relationship score, or receive a search field for a category.

An example embodiment may include a method and system of creating a collaborative database of documents, including receiving a suggested search field from a first user, listing the suggested search field when the rating reaches a threshold, receiving search terms for a document relating to the search field, and receiving a rating of the suggested search field.

Detailed descriptions of the above example embodiments may be illustrated herein.

FIG. 1 illustrates a diagram of an example configuration of an example reference and user rating system, according to an example embodiment of the present invention. Humans 100 and 101 may access terminals 102 and 103 which may be connected to the rating system 108. The terminals may be an interface such as a web application or a stand alone application on a PDA, laptop, desktop, or other available computing device. The rating system 108 may contain servers 106 and databases 107, which may be separate or integrated in a single system. The servers and databases functionality may also be distributed across multiple servers and databases. The server 106 may contain the instructions to perform the reference ratings and user ratings as well as integrating the ratings of the two. The database 107 may store information regarding the document data set or the data pertaining to users. The users may access the servers 106 and the information in the databases 107 through communication mediums 104 and 105. The communication medium may be a modem, DSL, cable, Ethernet, wireless, or any method of interacting through an intranet or internet.

Figure 2:
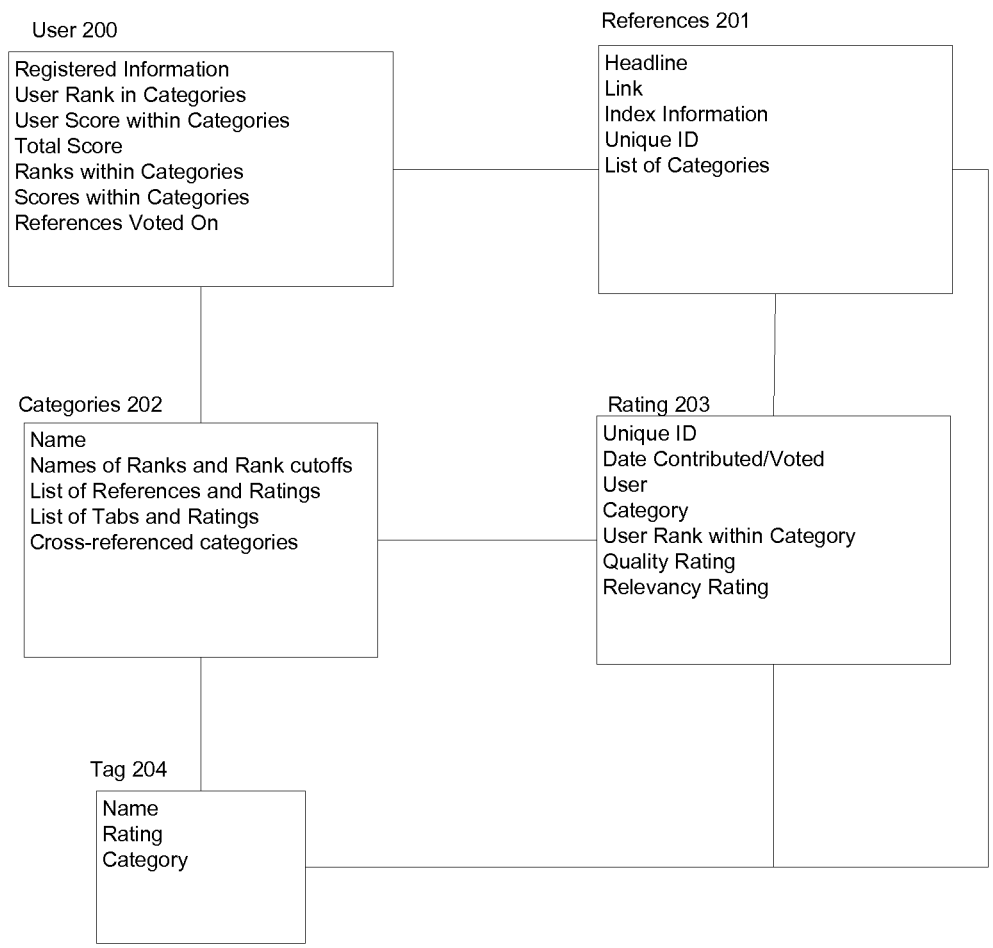
FIG. 2 illustrates a diagram of data that may be stored in a rating database, according to the example embodiment of FIG. 1.

FIG. 2 illustrates a diagram of data that may be stored in a rating database, according to the example embodiment of FIG. 1. The amount of data may vary in relation to the complexity and accuracy of the document data set (e.g. the number of documents, the types of documents, the variability in the documents, etc.). For example, in the rating system, the documents may be indexed and additionally the documents may be related to various categories. Users may then rate the documents based on several factors, such as quality, relevancy, etc. Users may also associate or group the documents with one or more categories, though some documents may be orphaned from any category. In static document data sets some information need not be stored, such as the date a document is added to the system, or the date a documents is changed, etc. Also, with smaller data sets, the complexity of storing information to assign documents to categories may not be needed.

With a larger document data set or one that is constantly being indexed, dynamically altered, receiving lots of ratings and contributions, or has new users, more data may need to be recorded. An example embodiment of a more complex system may store the information in FIG. 2.

A user 200 data set may contain registered information, such as a name, e-mail address, home page, or other contact information, and possibly personal information, such as a user's job, interests, etc. The user may have a rank within various categories and a score within various categories and these may differ between categories. A particular score may be needed to increase in rank in various categories. This may be explained in more detail in categories 202 below. A Total Score may also be stored, which may be a reflection of the user's general knowledge and activity in the system. Factors that may affect a user's Total Score may include, among other factors, a user's reference anchor activity, the number of categories in which a user is ranked, the scores of the user, and other stored information. A rating system may also rank the user in the overall system as a function of the total score or various factors that make up the total score. A list of references that the user rated may also be stored or associated with the user.

Reference 201 data and an associated rating 203 may also be stored to provide ranking and scores for documents and to ratings of users to determine the scores of other users. A reference may either be cached, or in the interest of saving storage space, a link may be stored. A headline describing the document, either parsed from the document itself or contributed by a user may also be stored. A reference may contain a unique identifier (ID) or possibly a hash key depending on the method of indexing and retrieving the references. A list of related categories may be stored; or, the rating 203 data may be used to find the relationships between references and categories.

Category 202 data, or information to group the links, documents, or references by a particular topic or sub-topic area, may also be stored. The number of ranks and rank cutoffs may also be stored. A list of references within the category and their associated ratings, a list of tabs and their associated rates, and any cross-referenced categories may be stored. Cross-references may be sub-categories, categories that should be consolidated but have not yet reached a score threshold, or simply related categories by topic. Cross-referencing categories may be explained in more detail in the example provided in FIG. 4*d*.

The number of ranks may vary between categories as would the rank cutoffs. This may be because some ranks are more popular than others and require different numbers of user ranks. The number of ranks and the cutoff number may vary by any number of factors. Factors may include, for example, the total number of references in the category, the number of reference anchor activity in a particular category or the number of reference anchor activity per week, day, etc., the number of users ranked in a category, the number of users having a score in a category, the total number of search queries that a category appears in the results page, etc. An administrator of the ranking system may alter the ranking score threshold, number of users per rank, and number of ranks based on the need a need to increase the appearance of exclusivity, encourage the number of users or editors to a particular category, or to reward contributors to categories. For example, an administrator may determine that for all categories with more than 1000 contributions a week there are 10 ranks with 10 users in each category. The names of different ranks may also very to keep things interesting for users in different categories. For example, in a "cooking" category or a related "recipe" category, rather than having the ranks named as "expert," "intermediate," and "novice," the ranks may be called "executive chef," "chef de cuisine," "sous chef," "chef de partie," etc., respectively, and expanded as needed depending on the number of ranks and activity in the category.

An administrator may also allow the number of ranks and users in a category to vary dynamically over time. Dynamic variation need not be instantaneous, though changes may be propagated instantaneously, the actual results provided to a user may be updated a specified static times, such as once a day, once a week, etc. As an example of dynamic categories, a category "intellectual property" may be a broad category with many users who contribute to sub-categories such as "patents," "trademarks," and "copyrights." Patents may receive more contributions than "trademarks" and "copyrights" and thus may have more ranks. Patents may have not only novice, intermediate, and expert, but in-between novice and intermediate may be "vice-intermediate," and in-between intermediate and expert may be "vice-expert." As an example, the number of people in each of those categories may be 20 users. "Copyrights" may have only the three ranks but have five users in experts, 10 users as intermediate, and 20 users as novices. There may be many unranked members in categories where users' contributions in those categories are minimal. It may be determined that while there are few contributors to the trademark category, they are very active, and thus the system may determine that there may be 20 experts allowed, 5 intermediate users, and 5 novice users in the "Trademark" category.

The top level category of "Intellectual Property" may have many users, but this may be a result of many overlapping contributors to the sub-categories of "patents," "trademarks," and "copyright." As a result, it may be determined that the system does not double-count reference anchor activity from the sub-categories and there may be few ranked users in Intellectual Property. For example, the system may determine that there may be one expert, two intermediate users, and two novice users in the "Intellectual Property" category. On the other hand, the system may allow double-counting of reference anchor activity, and as a result the number of ranks and users in those ranks may be even larger than all three sub-categories combined. For example, the system may determine that there may be three experts, fifteen intermediate users, and 1000 novice users in the "Intellectual Property" category.

The score for a user to be ranked in a category may vary over time and vary between categories and sub-categories. It is possible for a user to be ranked as an expert in a sub-category and ranked lower in the category, and vice versa. The score of the user depends on the reference anchors contributed by the user to various categories and the ratings of those reference anchors by other users.

From the example shown, by altering the number of ranks, users per rank, and threshold of scores to be able to enter a particular rank, an administrator may be able to alter the incentives of having users contribute to a category and receive varying amounts of recognition by the community within that category. Other recognition in the category may also be allowed. For example, if a particular category is returned in response to a search query, the ranked users of those categories may also be displayed and searchers may have the option of relying on the ratings of only those users, as will be explained in more detail in the search capabilities in FIG. 5b. Ranked users may also use this opportunity to promote themselves or their services. For example, an expert user in the patent category may also list his law firm's website in his profile. Having this advertising opportunity as a ranked user would encourage users to be not only vigorous in increasing reference anchor activity, but also to only have high quality activity, as will be explained in potential scoring methods below.

Rating 203 data may store a unique id associated with a reference, a category, or for itself. The rating 203 information may also store the date that a reference was contributed, which may itself count as a vote, or the actual vote itself. The rating 203 may also be associated with a particular user. The rating may be for a reference or for a category. The rating 203 information may also store the particular user's rank within the category for which the rating is attributed. A quality rating or a relevancy rating may also be stored.

For example, if there were a website "A" that was particularly relevant to categories "B" and "C", a first user may contribute website "A" to categories "B" and "C". The reference, associated rating, and relevant information pertaining to the first user may be stored. By making these contributions the system may count these as relevance ratings, attributing the contribution with a default rating of highly relevant. A high relevancy score may vary depending on how the scoring system is implemented (e.g. a point system, a star system, etc.). A second user who agreed with the high relevancy in category "B" but not with that of "C" may rate the relevancy of the reference as high for category "B" but not for its placement in category "C." Taking the second user's rank within the category into account, if the second user were a sub-expert in category "C" the first user may later receive a negative rating for having contributed a bad reference to category "C." If the second user were to later develop a higher rating and cross the threshold to a higher rank, such as "expert", then depending on the administrator's settings the first user's negative score may decrease even further. Or, if the second user, at his new "expert" rating, were to re-rate the same reference "A" for category "C", the second user's rating may in one setting replace the score first given, or in another setting be stored for that particular second user's rank of "expert" while preserving the prior rating given when the second user was a "sub-expert." Depending on the scoring methods as chosen by the administrator and the sorting features allowed, as will be explained later, the system may record different elements of ratings.

Tags 204 may also be associated with a category 202 or reference 201 and users may rate 203 the tags 204 for their relevancy. The name of the tag may be stored and each tag may be associated with multiple categories. Eventually, as will be explained below, tags for categories may be merged during a cross-referencing and consolidation process. If so, the ratings for those tags may be consolidated as well.

The list of stored information of a user, references, categories, ratings, and tags need not necessarily be stored with those data associations. Depending on the database, more information than needed may be stored in order to capture or create the necessary ratings for the user and document rankings and scores, as will be explained below, as well as the rating feedback loop that is created through the rating system. This information may thus be distributed across data structures, within a database, or as different fields than the example database information in FIG. 2. For example, a reference need not necessarily store the categories that it is listed in. This may be redundant, and rather a database table and the unique id of the reference, or a hash structure, may be used to retrieve the references corresponding with a category.

Figure 3:
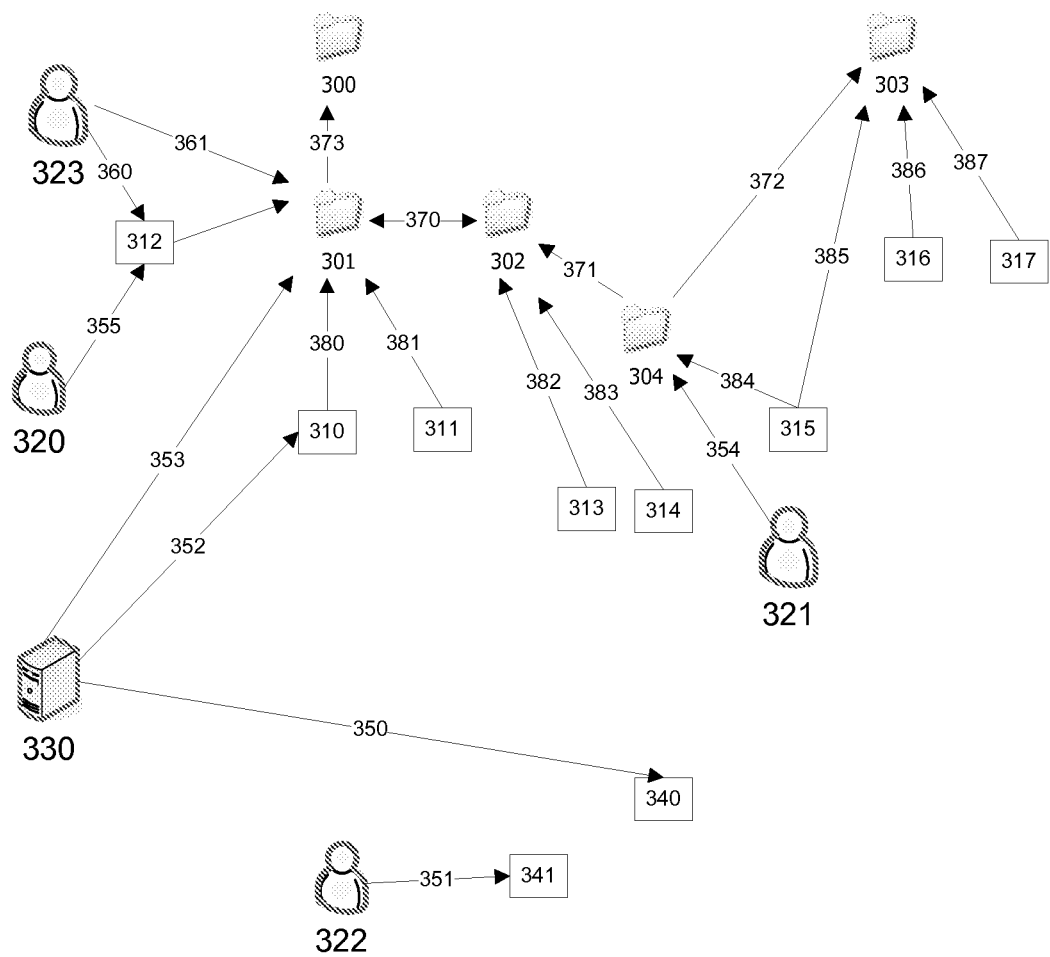
FIG. 3 illustrates a diagram of an example hierarchy of a subset of references within a reference and rating system, according to an example embodiment of the present invention.

FIG. 3 illustrates a diagram of an example hierarchy of a subset of references within a reference and rating system, according to an example embodiment of the present invention. In the example provided, there may be categories 300, 301, 302, 303, and 304, and documents associated with categories 310 through 317 that are associated with categories as well as stand-alone references that are not associated with any particular category 340 and 341 and may be retrieved based on the index terms of the document. Stand-alone documents 340 and 341 may be contributed 350 and 351, respectively, by either a server, e.g. a reference, rating, and indexing server 330, or by individual users 320. The documents associated with categories 310 to 317 as well as the categories 300 to 304 may similarly be created by the server or users. For example, a server may create 353 a category 301 and index and associate 352 a document 310. Another example may be a contribution of user 321 manually adding 354 a category 304. The server may add documents to categories based on the content of the documents.

As explained above, reference anchors may be any number of interactions that allow the system to eventually score and rank the user or a reference. FIG. 3 illustrates several reference anchors. The reference anchor may be any data or contribution that provides a measure of quality or relevance or information or the degree of expertise of a user within a particular topic area. For example, a reference anchor may be a document 312 to which a user 320 contributes a link to a document or the actual document itself. A reference anchor may also be any type of rating 360 and 361 to which a user 323 has provided regarding a document 312 and category 301, respectively, or other reference anchor.

Categories may have several hierarchical relationships. For example, categories 301 and 302, represented in the example by folders, may be related 370 to each other even if it may not be a sub-category 373 of the same category. Or, a category 304 may be a sub-category 371 and 372 within different category hierarchies 302 and 303. Categories, like references, may also be stand-alone and at a later time may be cross-referenced or associated with other categories, as will be explained below in FIG. 4d. A rating 361 reference anchor of a category 301 may be rating the relevance of a category being listed as a sub-category 373 of another top level category 300 in a hierarchy. Or, a rating 361 reference anchor may be a relevance rating of a tag of a category 301.

References, for example 340 and 341, may be stand-alone, as explained above, or references, for example 310 to 317, maybe associated 380 to 387 with categories 300 to 304. A reference, such as 315, may be associated 384 and 385 with different categories 304 and 303, respectively.

Figure 4A:
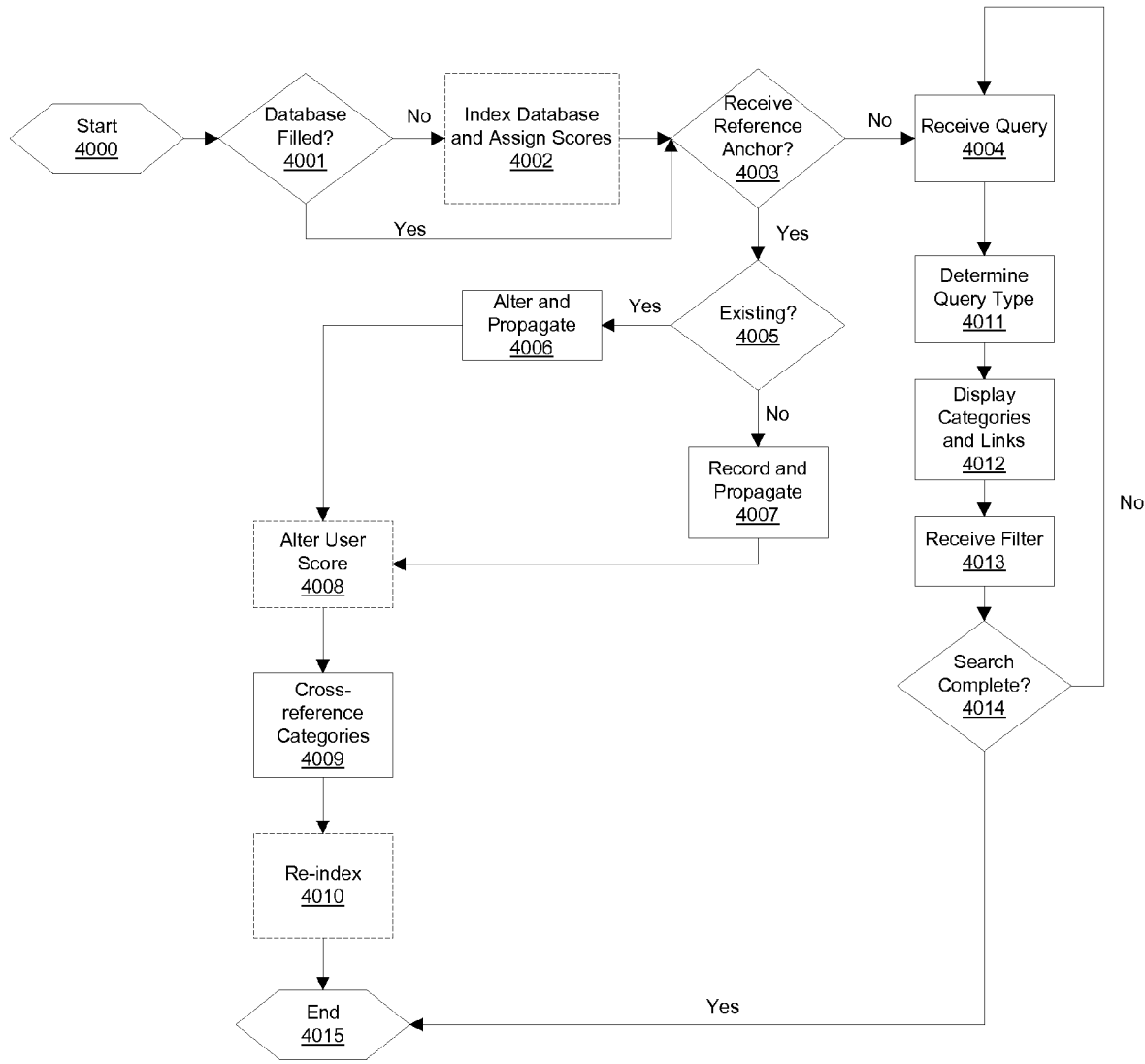
FIG. 4a illustrates a flowchart of an example system of indexing, cross-referencing, and rating reference anchors and users, according to an example embodiment of the present invention and using FIG. 3 to provide examples as needed.

FIG. 4a illustrates a flowchart of an example system of indexing, cross-referencing, and rating reference anchors and users, according to an example embodiment of the present invention and using FIG. 3 to provide examples as needed. After the system has started in 4000, in 4001 if the database is filled with indexed documents, then the system may either receive a reference anchor in 4003 or may receive a search query in 4004. If in 4001, the database has no references, in 4002 the system may automatically index a database of documents or have crawlers index documents and assign scores based on settings established by an administrator, e.g. a relevancy score, a content score, etc. While a crawler may be used to index an initial base set of documents this may be optional as having no documents in the database would not preclude the system from receiving reference anchors in 4003. It may be possible for the database to be built purely from contributions from users starting in 4003 or from the combination of indexed documents and contributions of users combining 4002 and 4003. For example, from FIG. 3, an indexed reference may be a reference anchor category 301 created 353 by a server 330 or a reference anchor document 340 indexed 350 by a server 330.

If the database has references in 4001, the system may find the need to not re-index the database at that point and directly allow the receipt of reference anchors in 4003. The reference anchor may be one of any type of a reference anchor that may be contributed by a user, such as any type of rating of another reference anchor, a document, a tag, a category, etc. If in 4003 the system receives a reference anchor, in 4005, the system determines whether the reference anchor already exists in the system. If, in 4005, the reference anchor exists in the system, in 4006 the system may alter the reference anchor stored in the database and propagate those results across the other data in the database. This is explained in more detail in FIG. 4c. For some types of reference anchor another check may be performed in 4005. For example, sometimes websites will change the location of a document or rename a document or place the document in a new directory. In such a situation, the server may want to maintain the association of all the ratings and reference anchors. A check may be accomplished wherein the user may either suggest a correlation of URL's, documents, etc. or the system will perform a comparison check of that document with other documents in top level URL and check for similarity of content, either textual, image, audio, video, or a combination thereof. If two documents or reference anchors meet a threshold of similarity as determined by the administrator, the ratings and other information from the old reference anchor may be associated with the new reference anchor.

If the reference anchor does not exist in the system in 4005, then in 4007, the reference may be recorded and the system may propagate any changes resulting from adding the reference. This is explained in more detail in FIG. 4b. In 4008, particularly if the reference anchor is a rating, and if the score of a user has not been altered, the user score may be optionally altered here. Any changes by adding a reference anchor may also have altered the dynamic of the categories. As such, in 4009, categories may be cross-referenced to determine whether a similarity reference or a consolidation may be needed. In 4010, the references, documents, tags, and categories, may require re-index, although this is also optional. The re-indexing may be similar to the indexing performed in 4002, or the re-indexing may at this point integrate the results of user ratings and rankings if not already performed in 4006 or 4007. The system ends in 4015.

In 4003, if the system had not received a reference anchor then it receives a search query from a user in 4004. In 4011, the query type may be determined. The query type may be a search for a specific document type, a search for a particular category or group of categories, or a pure word search which would return a display containing documents of various document types and categories. In 4012, a display of categories and links to search results may be presented to the user. Having different ranks and ratings of users offer a searcher a unique method of sorting and focusing a search. Some examples of altering the result list and the display is illustrated in FIGS. 5a to 5e. In 4013, the user may filter the results through various mechanisms, as illustrated in FIG. 5c. If a user's search is complete in 4014, the user may conduct a new search in 4004 or end in 4016.

Figure 4B:
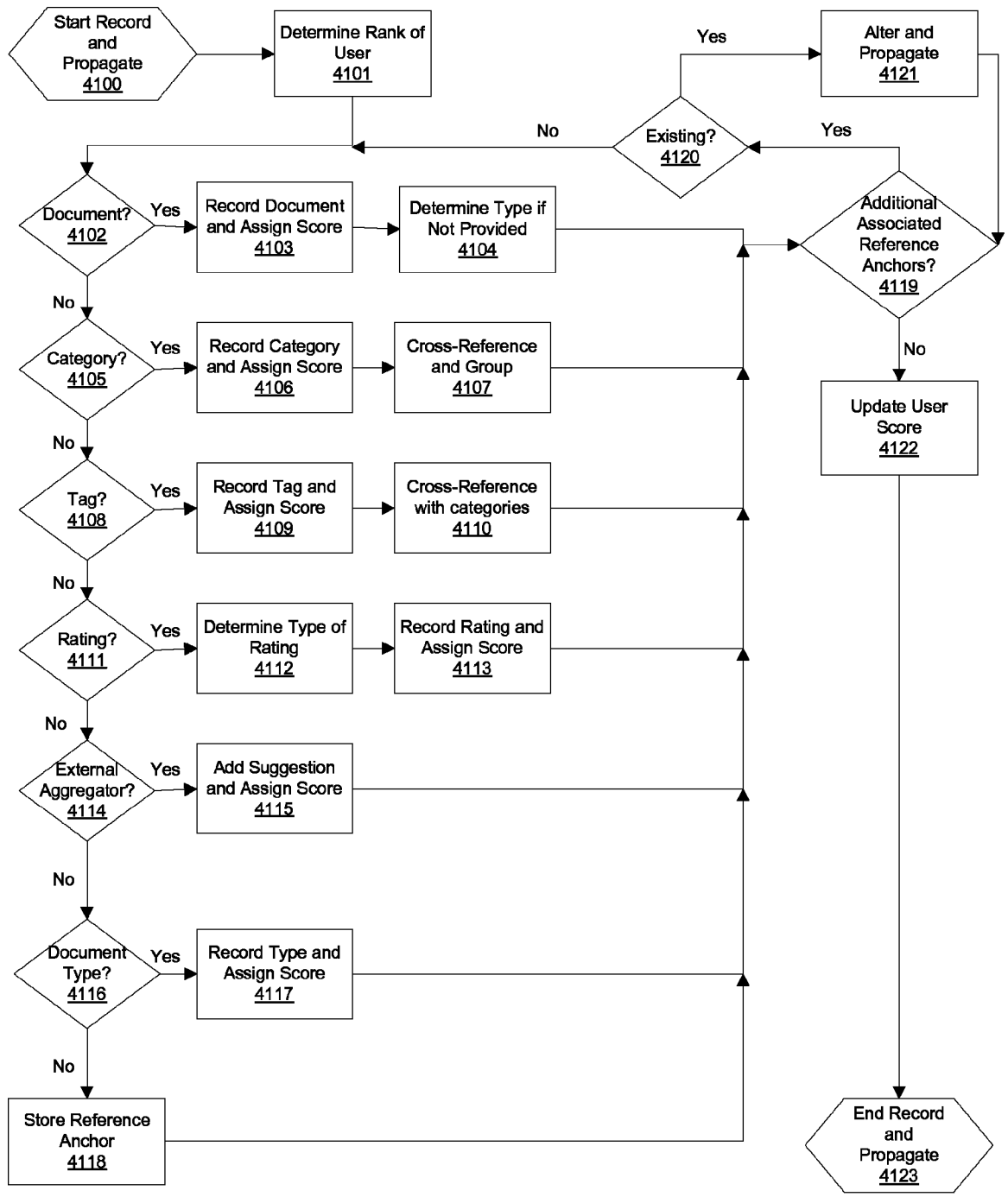
FIG. 4b illustrates a flowchart of an example method of recording a new reference anchor and propagating the results in an example system of indexing, cross-referencing, and rating reference anchors and users, according to the example embodiment of the FIG. 4a and using FIG. 3 to provide examples.

FIG. 4b illustrates a flowchart of an example method of recording a new reference anchor and propagating the results in an example system of indexing, cross-referencing, and rating reference anchors and users, according to the example embodiment of the FIG. 4a and using FIG. 3 to provide examples. In 4100, the system may start to record and propagate the reference anchor it has received from a user. In 4101, the system may determine the rank of the user. If the user had provided a category for which a reference anchor was associated, then the rank of the user for that category may be retrieved or determined. If a category was provided by a user, but if that category didn't exist, then the system may determine the closest category and assume that the user's rating and feedback rating, will be for the closest category of the reference anchor.

The type of reference anchor may then be determined. In 4102, if the reference anchor is a document, in 4103, the document or a link to the document may be stored in the system's database. Any ratings provided by the user, such as a relevancy rating or quality rating, are associated with the document. If the user did not provide a document type, in 4104, the system may determine the type based on factors such as the amount of text, number of search fields, types of files embedded in the document, etc.

If in 4102, the reference anchor was not a document, in 4105, the system determines whether the reference anchor is a category. If in 4105, the reference anchor is a new category, in 4106, the new category is recorded in the database. Either a rating provided by the user or a base score provided by the system may be associated with the new category. A base score of the system may be a default score, possibly adjusted by a number of factors such as the number of sister sub-categories there are, the number of references that those sister sub-categories there are, the likely number of parent categories, etc. This may indicate the impact factor that the new category is likely to have in the future. In 4107, the new category may be cross-referenced with another category and possibly grouped into another category, as will be further explained in FIG. 4d.

If, in 4105, the reference anchor was not a category, in 4108 the system determines whether the reference anchor is a tag. If in 4108, the reference anchor is a new tag, in 4109, the new tag may be recorded in the database and associated with the particular reference, category, document, or both, that the user indicated the reference anchor was to be associated. If the tag was associated with a category, in 4110, the tag may be cross-referenced with other tags in associated categories or consolidated with other groups, as will be further explained in FIG. 4d.

If, in 4108, the reference anchor was not a tag, in 4111 the system determines whether the reference anchor is a rating. If in 4111, the reference anchor is a new rating, in 4112 the type of rating may be determined. For example, the rating may be a relevancy rating, which is a rating of the relevance of a particular document with a particular category. One example of a measurement of relevancy may be the percentage of the document that is related to the particular category or topic with which it is associated. Another example measurement may be the percentage of tags of a category that would overlap with that document. The rating may be a quality rating, which may be the amount of content of the document or the breadth of depth of information departed by a document within a particular category. In 4113, the rating may be stored and a default score of the rating itself may also be assigned a score or rating. This rating may be later used to assess the user that contributed the rating. An administrator may set a rating method of allowing stars, where 5 stars is highest and 1 star is lowest, or a score of 1 to 10 where 10 is highest and 1 is lowest, or even a scale where 0 is neutral 5 is highest and negative 5 is lowest, etc. In one example, a user, under the star rating system, may rate a document as a relevancy of 5 stars for a category. The rating itself may be given a default neutral score of 5 points out of 10. If, later on, multiple users of various ranks all rated the document to have a relevancy of 1 star in relation to the category, the first user's score for that rating may become 2 points out of 10. Note here that the first user's rating of the document is different from the user's score of that rating, which is actually determined by other users' ratings and the overall score of the reference, which may also have a contribution by an indexing system. If the index system assigned the document as highly relevant, this may also alter the score of the first user by increasing the first user's score for that particular rating.

If, in 4111, the reference anchor was not a rating, in 4114 the system determines whether the reference anchor is an external aggregator. An external aggregator may be a suggestion of a field that may be used for advanced searches within a category. For example, in the category of "recipes", if a user suggested "ingredients" as a field, then the "ingredients" field may be an external aggregator. If in 4114, the reference anchor is an external aggregator, the suggested external aggregator may be added as a potential field and assigned a score.

If, in 4114, the reference anchor was not an external aggregator, in 4116, the system determines whether the reference anchor is a document type suggestion. If in 4116, the reference anchor is a document type suggestion, in 4117, the document type is recorded and a score is assigned to the document type suggested by the user. If in 4116 the reference anchor is not a document type, the reference anchor must be a new type assigned by the administrator. In 4118, this reference anchor is stored as a general reference anchor associated with the user that provided the reference anchor.

After the first reference anchor of a user is determined, the user may have provided other reference anchors at the same time. For example, a user may suggest a new document be associated with a new category and indicate the document type for the document while rating the document and the category. In 4119, the system determines if there are additional associated reference anchors. If there are additional associated reference anchors, in 4120, the system determines if the reference anchor already exists in the system. If in 4120 the reference anchor does not exist in the system, the additional associated reference anchors are recorded through the flowchart described above, starting again with 4102. The order of determining the reference anchors type may be different so long as the system assesses the type of reference anchor.

If in 4120, the additional associated reference anchors already existed in the system, then the reference anchor would be altered and the results propagated in 4121, which will be explained in more detail in FIG. 4c. For example, a user could have provided a new document into an already existing category, while providing a rating for both the new document and the old category, having already provided a previous rating for the old category. In this example, the new document and rating would be recorded, and the old category and rating would be altered for that user. If in 4119, there were no more associated reference anchors, then the user rating is updated in 4122. The user score may be updated within a category if the user added a reference anchor that reflected expertise in the topic area, such as by adding a new document or rating a document that was also highly rated by others, as will be explained in the example rating systems below. The update of the user may also be propagated if the user's increase in rank or score affects other reference anchors, as will be explained below in the scoring and rating system. In 4123, if there are no more reference anchors, then the system ends recording and propagating.

Figure 4C:
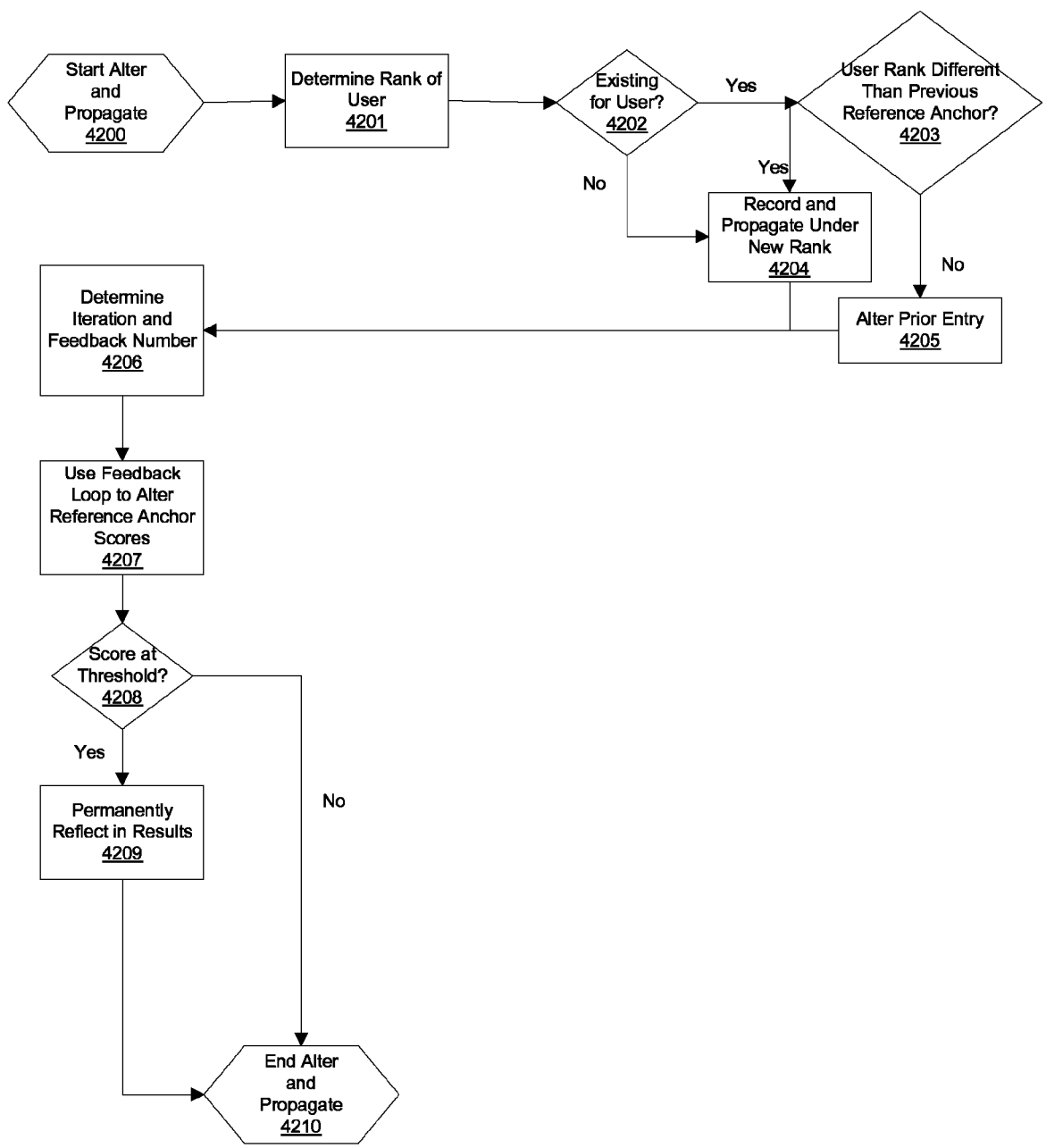
FIG. 4c illustrates a flowchart of an example method of altering a record of an existing reference anchor and propagating the results in an example system of indexing, cross-referencing, and rating reference anchors and users, according to the example embodiment of the FIG. 4a and using FIG. 3 to provide examples as needed.

FIG. 4c illustrates a flowchart of an example method of altering a record of an existing reference anchor and propagating the results in an example system of indexing, cross-referencing, and rating reference anchors and users, according to the example embodiment of the FIG. 4a and using FIG. 3 to provide examples as needed. In 4200, the system starts to alter and propagate the reference anchor. In many instances, if pre-indexing is already performed by the system and the reference anchor is a document or category, then the system will initiate an alter and propagate rather than a record and propagate, as explained above in FIG. 4b. In 4201, the system determines the rank of the user. In 4202, if the reference anchor already exists for the particular user, then in 4203 the system determines whether the user rank has changed since the user last submitted the reference anchor. If the user rank is different, then in 4204 a new entry is created for that particular reference anchor and the reference anchor may be returned to a "record and propagate" flowchart for the reference anchor, under the same user but with a new record associated with the user's new rank. This new reference anchor association may be useful in a sorting feature of the display, as will be explained below in FIG. 5c. If in 4202, the reference anchor, though existing in the system, was not existing for that particular user, then the system initiates a "record and propagate" in 4204. In the case of documents or categories, an administrator may set all contributions to a default score, such as an automatic high relevancy rating. For ratings, tags, etc. these may be recorded and associated as explained above in FIG. 4b. If in 4203 the user rank was the same, then in 4205 the user is simply changing a rating previously contributed, possibly because the user has become more sophisticated during the short period of time, and the system alters the prior entry.

In 4206, the system initiates the propagation of the score by determining the iteration and feedback number. The iterative feedback scoring loop may vary depending on administrator settings and other factors, such as how much information is stored. The iterative feedback scoring loop may use the scores of users and references to affect the scores of the other based on changes to those scores. Thus, a change in a first user rating may affect references anchors associated with that user, and a change in a reference anchor associated with a number of users may affect that users, and vice versa in an iterative loop, the extent of iteration and feedback which is determined by settings decided by the system administrator.

Using the example reference anchors in FIG. 3, if a user 320 contributed a document, such as 312, and the document was new to the system, it would be stored into the system and associated with that user. The rating of that document would have either the rating provided by the user, as explained how in FIG. 4b, or by a default rating for merely contributing the document if a rating had not been provided, as explained in 4204 in FIG. 4c. For purposes of clarification, for this example it will be assumed that the administrator chose the option to have reference anchors rated on a five star scale with five being the highest rating and one being the lowest. For purposes of this example, it will be assumed that the administrator chose the option to have users scored on a ten-point scale with ten being the highest score and one being the lowest score.

Under a simple scoring method, weighting of a user's rating power is simply a multiple, where the multiple is determined by the rank. For example, one way of determining the multiples in a four tiered system with experts being the highest, intermediates next highest, novices next highest, and unregistered users or guest users as lowest, would be a multiple of four, three, two, and one, respectively. For example, if a document was initially added by a user and given a base rating of 3 stars and a user was unregistered and voted it as four stars, then the final rating would be the average which is: (3+4) divided by 2=3.5 stars. On the other hand, if in the example the document was contributed by a user and given a base rating of 3 stars and an expert user wanted to vote a document as rated as four stars then with a multiple of 4, the final rating would be the average which is: (3+4*4) divided by 5=3.8 stars. As another example, an administrator may take the total value of the ratings, rather than the average. This may unfairly weight even bad documents because even receiving a bad score of 1 would still elevate the score of a document, while those that received 5 stars but few contributions of 5 stars from experts would be lower ranked. There are ways, however, to implement the use of total scores without using average, for example, if instead of a one to five scale, a scale of negative five to five was used. In this scenario, the total rather than the average may be for the score without the bias the amount of rating affecting the accuracy of the rating. It may also be understood that the weighting may be varied according to the administrator's own settings. For example, there may be more tiers of ranks for users, and also the weight of the users can vary significantly. For example, the expert ranking may be a multiple of a hundred while an intermediate rank has a multiple of thirty. An example simple formula for determining the score of reference anchors of the administrator's choosing may be: Reference Anchor score=Avg (from 1 to n) $[(w_u*r_u)]$ where $w_u$ is the weight multiplier of the user based on his rank; $r_u$ is the rating provided by that user; Avg is taking the average; and n is the number of users who have rated the particular reference anchor.

Each of the users would have different weight based, in the particular example above, on their rank weight. Another example below will show that the user ratings may be weighted based on other factors in addition to rank of that particular category, such as a user's rank in other categories, related or otherwise, the amount of contributions, total or per a certain time period, etc. The actual rank weight may differ between categories. For example, an expert in a "patent" category may have a different weight than an expert in a "flowers" category. The weight dynamically changes depending on factors such as reference activity in the category or related categories or in the category hierarchy, the total number of reference anchors, the number of ranked users that are active, the scores of various users in the system, etc. The purpose of balancing the weighting of ranked users is so that there is not a situation where too many low level users actually negate the positive ratings of experts for a document because the document is too advanced for the low level users. For example, in categories with a high threshold for understanding the concepts in that category, novice users may at first consider some documents to be poorly rated for relevancy or content merely because the users themselves do not understand the documents. If, however, the expert users rate documents highly and guide or even force those novice users to accept that those are the most relevant sites to read, then eventually those novice users will achieve a higher level of understanding. With the higher level of understanding, those novice users will eventually become expert users as well. The only time that the votes of novice users would outweigh that of experts may be in the example provided below where the search is sorted by the rank of the user so that the easier-to-understand novice documents are presented to novices while the documents geared to experts may be sorted by that rank.

Under the simple scoring method of the example above, various features may be used to provide a more accurate rating method for particular uses. For example, some reference anchors may receive a negative rating not because they are not relevant or of low quality but because some are meant to have novice acclimated to a topic, and others are meant to be used by experts in the area. For example, a website titled "A Beginner's Guide to Patents" may receive significantly lower ratings by experts but receive very high ratings by novices, and, vice versa, a website titled "the expert's guide to patents" may receive high ratings by experts but low ratings because it is confusing for novices. With a sorting feature, users that are novices may want to list documents that are highly rated among fellow novices. An example formula may be: Reference Anchor score for rank=Avg (from 1 to z) $[(w_u*r_u)]$ where $w_u$ is the weight multiplier of the user; $r_u$ is the rating provided by that user for the particular rank; Avg is the average; and z is the subset of users that have votes when they were at that particular rank. Under this simple method, it may be true that some newly registered users are already "experts" even before the system ranks them as such, and as a result they still may vote like an expert and rate novice-focused reference anchors lower. However, the level of error is negligible considering that in most areas the there are usually more novices than knowledgeable users. If an administrator is wants to correct for this error, when a user does become elevated to the expert level quickly or if the number of entry level reference anchors were rated highly by experts, then the administrator may consider that the user was a pre-ranked "expert" and not count that user's votes under the novice ranking. In other words, the user's votes would be considered outliers that are not reflective of the general novice rank of that category.

Under the simple scoring method of the example above, the users may also be rated and scored. The user may be rated based on the ratings of other users that rate the same reference anchors, such as documents, categories, etc. Under the simple scoring formula above, a simple formula for scoring users may be: User Score=(for 1 to n) Avg. $[h-\text{Adjusted}|(R_u-R_s)|]$ where n is all the reference anchors contributed or rated by the user; h is the highest score a user can have; $R_u$ is the rating provided by the user for document n; $R_s$ is the current score of the reference anchor; Avg is taking the average from 1 to n; and $|(R_u-R_s)|$ is the absolute value of the difference in ratings. The simple formula is simply taken the differences in the ratings provided by the user and the document and subtracting that difference from h, where h is the highest rating. If the user's particular rating was exactly that of the reference score, then the user is considered to have "accurately" assessed the reference anchor's value, either relevancy or quality, and the difference would be zero. Subtracting zero from h would give the score of h, meaning that if the user accurately assessed the score of the document, then he would have the highest rating. As the rating or reference anchor score provided by the user became farther from the actual rating of the reference anchor assessed by other users, user score for that document would go down.

In the particular example formula, because the ratings of reference anchors are on a different point scale than the user ratings, the administrator may have to use "Adjusted$|(R_u-R_s)|$" which is an adjustment of the difference of the ratings, otherwise the worst score a user may have under the formula above is a score of five, which is the highest user score of ten minus the highest difference which is five. The method of adjustment may vary based on how much weight the administrator may want to consider for various reference anchors. For example, categories may be worth than tags which may be worth more than documents. Different weights may have to be assigned to the differences, for example, a multiplier of three may be applied to the absolute value of the difference in ratings for categories. In this scenario, a complete difference in ranking would actually create a negative rating. All the user score assessments are averaged, and the final average is the user score for that category. One skilled in the art would understand how this formula could be applied to multiple categories across the system and accumulated to determine a user's score for the entire system.

If an administrator wanted a user score to be more closely tied to the rankings of those that are assessing the same documents, an example formula may be: User Score=(for 1 to n)Avg. [h−Avg (for 1 to L) [$w_k$*Adjusted$|(R_u-R_{avgk})|$] where n is all the reference anchors contributed or rated by the user; h is the highest score a user can have; L is the number of ranks in the particular score being determined; $w_k$ is the weight for that particular rank; $R_u$ is the rating provided by the user for document n; $R_{avgk}$ is the average rating of a particular level; $|(R_u-R_{avgk})|$ is the absolute of the difference in ratings; and Adjusted $|(R_u-R_{avgk})|$ may be an adjustment based on factors like a document type, category topic, etc. as may be determined by a system administrator. For purposes of explanation a user is assumed to be rated on a ten point scale with ten being the highest and one being the lowest score. For purposes of this example then, h would be the high score of 10.

Under this example formula, suppose a user had contributed three documents to a particular category, and rated seven other documents. That would be a total of ten documents, and n would be 10. Assume for the example that the particular example category had four ranks of expert, intermediate, and novice, and unregistered so that L is four. Each of the ranks would have a different weight, for example, the administrator may arbitrarily assign expert to have a weight of ten, intermediate to have a weight of five, novice a weight of two, and an unregistered or guest user to have a weight of one half. Assume that for the first document, the expert users had rated the document a 4.9; the intermediate users had rated the document a 4; the novice users had rated the document a 2; and the unregistered users had rated the document at 3.5. Also, assume that the user had contributed the document and the system gave it a default rating of 5. For the sake of simplicity, assume the adjustment is simply a multiplier of two. Then for the first document the formula with the variables would be: h−[$w_1$*2*$|R_u-R_1|$+$w_2$*2*$|R_u-R_2|$+$w_3$*2*$|R_u-R_3|$+$w_4$*2*$|R_u-R_4|$]/(w1+w2+w3+w4))=10− [10*2*|5−4.9|+5*2* |5−4|+2*2*|5−2|+1*2*|5−3.5|]/(10+5+2+1)=10−[2+10+4+3]/18=10−19/18=10−1.1 (rounded to the nearest tenth)=8.9. The example shows that the weight of the expert score is weighted particularly high. However, this is only for a single document, and this inner formula would be repeated n times in order to take the average for the n documents.

Consider now, if the situation had been reversed for the first document and the user had not been in agreement with the expert users but rather with the novices, then the user rating would be much lower. For example, under the same hypothetical numbers as above but switching the expert users having rated the document a 2 instead of a 4.9 and the novice users having rated the document a 4.9 instead of a 2, the results would be: h−[$w_1$*2*$|R_u-R_1|$+$w_2$*2*$|R_u-R_2|$+$w_3$*2*$|R_u-R_3|$+$w_4$*2*$|R_u-R_4|$]/(w1+w2+w3+w4))=10− [10*2*|5−2|+5*2*|5−4|+2*2*|5−4.9|+1*2*|5−3.5|]/(10+5+2+1)=10−[60 +10+0.4+3]/18=10−73.4/18=10−4.1 (rounded to the nearest tenth)=5.9. From the disparity in the score, one can see that when a user differs significantly from the expert users, or those that supposedly have a high understanding of the topic area, then differing from those expert users would result in a lower score for that particular document. Thus, if a user wanted to be biased or malicious and rate his own websites higher or to rate bad website highly or good websites or competitor websites poorly, he would do this at the risk of having a worse score for that document. A worse score for that document would affect his average and ultimately his overall score. Since the weight or influence of a user's rating is based on his score, it would be against his interest to act with bias or malice because such an act would render his biased vote relatively ineffective based on the feedback rating.

While taking the weighted average above is only one example of a formula that may be used to score the users, an administrator may add optional factors that may affect the user's score. For example, the administrator may award points for the number of contributions of new documents, rather than just submitting ratings of documents. The administrator may also award points for the amount of activity, for example additional points for being in the top ten percentile of users who contribute new sub-categories, tags, documents, or votes in a particular category. The administrator may also penalize a user for significant inactivity in a category, submitting spam websites or virus-laden websites, where these types of websites may be detectable through a special input for other users to vote to indicate that the website is a spam website or virus-laden website.

Since the score or rating of those documents is a reflection of ratings weighted by the scores of other users, there may be a feedback loop of users rating documents whose increased ratings affects other users. If there was an overlap between what those users rated, then scores of users and references may increase. This may largely occur when references anchors or users are at the cusp of a rank. For example, if a first user rates a first document which was rated by a second user, and a second user had rated a second document that was rated by the first user. It is possible to have a feedback scenario where, when the first user increases in rank and re-rates the first document and the system takes into account the higher rank during a propagation event, and the newly increased rating of the document increases the ranking of the second user, which in turn may increase the rank of the first user. In such a scenario, the system administrator may have to determine the extent of the propagation.

An administrator may choose the factors that impact the scoring of either references or users. Generally, a user may affect the rating of a reference anchor, and vice versa.

$$S(R) = k + m[S(U_1)*S(V_1) \ldots m\, S(V_n)*S(R_n)]$$

$$S(U) = j + w[S(R_1) \ldots S(R_n)]$$

where S(R) is a function of the reference anchor score and $S(U_n)$ is a function of a score of a user; k is an initial constant of an initial rating of a reference by the first user or a default score; j is an initial constant of an initial score of a user or a default score; m is a weight of a rating of a user score; w is a weight of a rating of a reference score; $S(V_n)$ is a vote of a user and adjusted as a function of a user's rank. As the score of a user changed, a score of a reference may adjust and vice versa.

Returning to the flowchart in FIG. 4c, in 4206, after the system determines the iteration and feedback number, in 4207, the system may use the feedback loop to alter reference anchor scores for multiple references anchors associated with the first user and reference anchors associated with the plurality of users associated with the first reference anchor score provided in 4202. In 4208, if any of the reference anchors have a score that crosses a particular threshold, in 4209 the new option is permanently added to be reflected in the search query. For example, if the score threshold is relating to the document type, then the action may be altering the document type. If the reference anchor were a tag, then the tag may be associated with a category, or possibly if the tag was rated as not particularly relevant, then the tag may be disassociated with a category. Or, as another example, if an external aggregator were rated highly, then from that point forward users may be able to permanently add document trait suggestions to the particular external aggregator field for documents in that category. Another example may be allowing a sub-category to have a ranking system at all. The system may require a threshold because otherwise a user may be able to create a category that is so sub-specialized that it is of little use or general interest. Therefore, various factors may need to be considered, such as activity in searching the sub-category, activity in contributions to the category that are not from the same user that created it, etc. in order to determine whether the sub-category should even exist, the levels of ranks in the category, how many people are to be within each rank, the score threshold needed to enter the ranks, etc. If in 4208, a score threshold determined by administrator settings was not crossed, in 4210 the system would end altering and propagating.

Figure 4D:
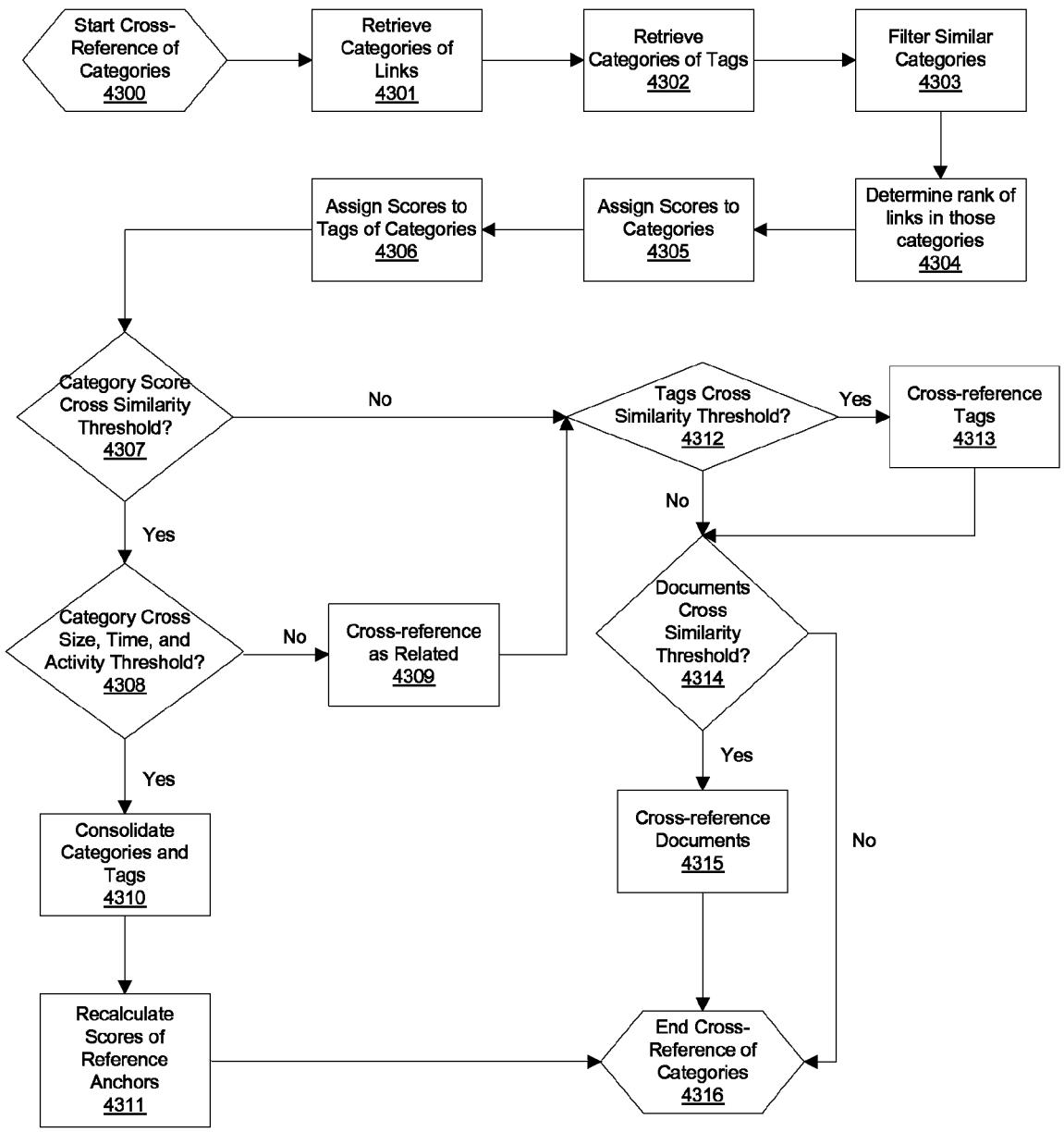

FIG. 4d illustrates a flowchart of an example method of cross-referencing and consolidating categories in an example system of indexing, cross-referencing, and rating reference anchors and users, according to the example embodiment of the FIG. 4a. In an example embodiment, a cross-reference of categories may compare links, tags, or other reference anchors from different categories in order to determine similarities between those categories. The accuracy of the similarity may vary depending on the number of factors used to determine similarity, and the depth of which to determine that similarity, which will be explained in more detail below. The administrator of the server may also take into account the structure of the particular database created to store the categories and links, as well as the processing power required of the particular servers and time required in choosing those factors and vice versa, these factors may affect how the reference anchors, links, categories, etc. may be stored.

In 4300, the system may start the cross-referencing of categories by, in 4301, retrieving the information pertaining to all the categories of links, and in 4302, retrieving all the categories of tags, of all links for a category. In an example embodiment, for a particular category all other associated categories of those links may be retrieved to initiate a comparison. In 4303, if there are absolutely no links in common between two categories, it may be determined that it is unlikely that those categories are related. On the other hand, if there are links in common then those categories may be considered to be similar to the first category. The system may then determine the extent of the similarity in 4304 when it determines the rank of the links or reference anchors in those categories. A system administrator may decide which factors are most important in determining the similarity. A factor may be the similarity in the highly rated reference anchors, such as documents or links to those documents. For example, two categories may be considered similar if the reference anchors that are rated highly in a first category are rated approximately as high in a second category, and vice versa if those rated lower in the first category are rated similarly lower in the second category. Another example factor may be if the same tags are used to describe both categories. Another example factor may be the number of similar users that are ranked within those categories. Another factor may be any overlap in other categories that are already associated as being similar to a particular category.

In 4305, after all the factors have been considered, the system may assign a score to each of the potentially similar categories. In 4306, scores may also be assigned to tags. Scores for tags may be based on similarity in the text or any variations that may indicate similarity based on context and the other tags in the category. For example, a tag may be a query and another tag may be the same query but worded slightly differently. If the system is able to parse the query and determine the context, possibly from a thesaurus or dictionary, the system may score the two tags as similar. In 4307, if a category score crosses a similarity threshold, then in 4308, the system may determine whether the category also crosses a size, time, and/or activity threshold. The system may make this determination in order not to preemptively determine two categories are similar enough to be consolidated without gathering enough information. For example, two categories may have similar reference anchors but if the second category is not very large then it may be difficult to determine whether the categories may have some overlap but there are not enough data points to determine how much overlap there is. As another example, a category may have just been created and there hasn't been enough time since the creation and the cross-reference comparison to determine whether there is similarity. Or, another example may be that there has not been enough activity in the category to accurately determine the similarity of the category with another category. If the similarity threshold was passed in 4307 but did not cross the size, time, or activity threshold in 4308, then in 4309, the system may determine that while the categories are related, there has not been enough information to consolidate the categories and tags.

If in 4308, the size, time, and activity threshold had been crossed, then in 4310, a category is integrated with the original category being cross-referenced. All the documents or links and other reference anchors, such as associated votes for documents, the category, etc. may be associated with the original category. In 4311, the newly merged category may be re-indexed, user scores may be altered, and scores of the user and the related ranking within the category may change. The number categories, the score threshold to be ranked, as well as the number of users in each rank may change as well. In 4316, the system ends cross-referencing the categories.

If in 4307 the category score does not cross a similarity threshold, or after 4309 where the categories are cross-referenced but not merged, in 4312 the system determines if a tag's similarity score obtained in 4306 crosses a similarity threshold. The system may still determine that, though the categories are not ready to be merged, that some of the reference anchors may still be helpful in the original category. If in 4312 the system determines that a tag's similarity score crossed a similarity threshold, then in 4313, the tags are cross-referenced by copying over the tags completely with all associated votes and allowing the tag to start with some reference anchor information but grow by itself in the new category and independent of any ratings of the tag in the category from which it originated. If in 4312 the tags did not cross a similarity threshold, in 4314 the system determines whether the documents and associated reference anchors cross a similarity threshold. If in 4314 the documents cross a similarity threshold, then in 4315, a cross-reference is made to the documents and the documents are stored with the original category being cross-referenced. In addition, these cross-referenced documents may still be monitored, for example, the way these cross-referenced documents are rated may affect score to determine the similarity between the two categories. If in 4314 the documents did not cross a similarity threshold, in 4316 the system ends the cross-reference of categories.

Figure 5A:
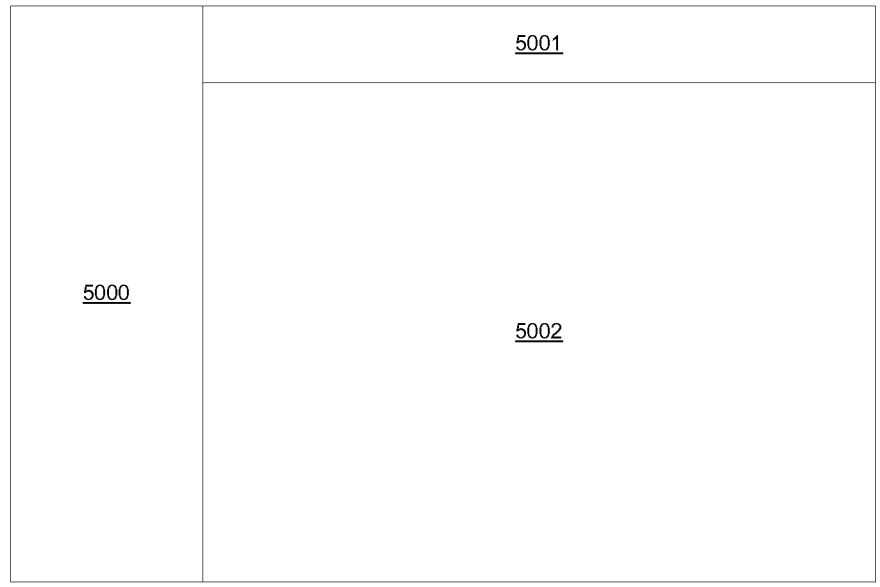
FIG. 5a illustrates an example interface of a search query of an indexing, cross-referencing, and rating reference anchors and users, according to an example embodiment of the present invention.

FIG. 5a illustrates an example interface of a search query of an indexing, cross-referencing, and rating reference anchors and users, according to an example embodiment of the present invention. The example interface may display three frames 5000, 5001, and 5002. Each of the frames may display different functionality. For example, a category frame 5000 may contain the various categories that are related to a search query, as will be explained in more detail in FIG. 5b. A menu frame 5001 may contain different interfaces for contributing reference anchors, as will be explained in more detail in FIG. 5c. A menu frame 5002 may contain the results of a search query and also contain different ways of adding reference anchors, as will be explained in more detail in FIG. 5e.

Figure 5B:
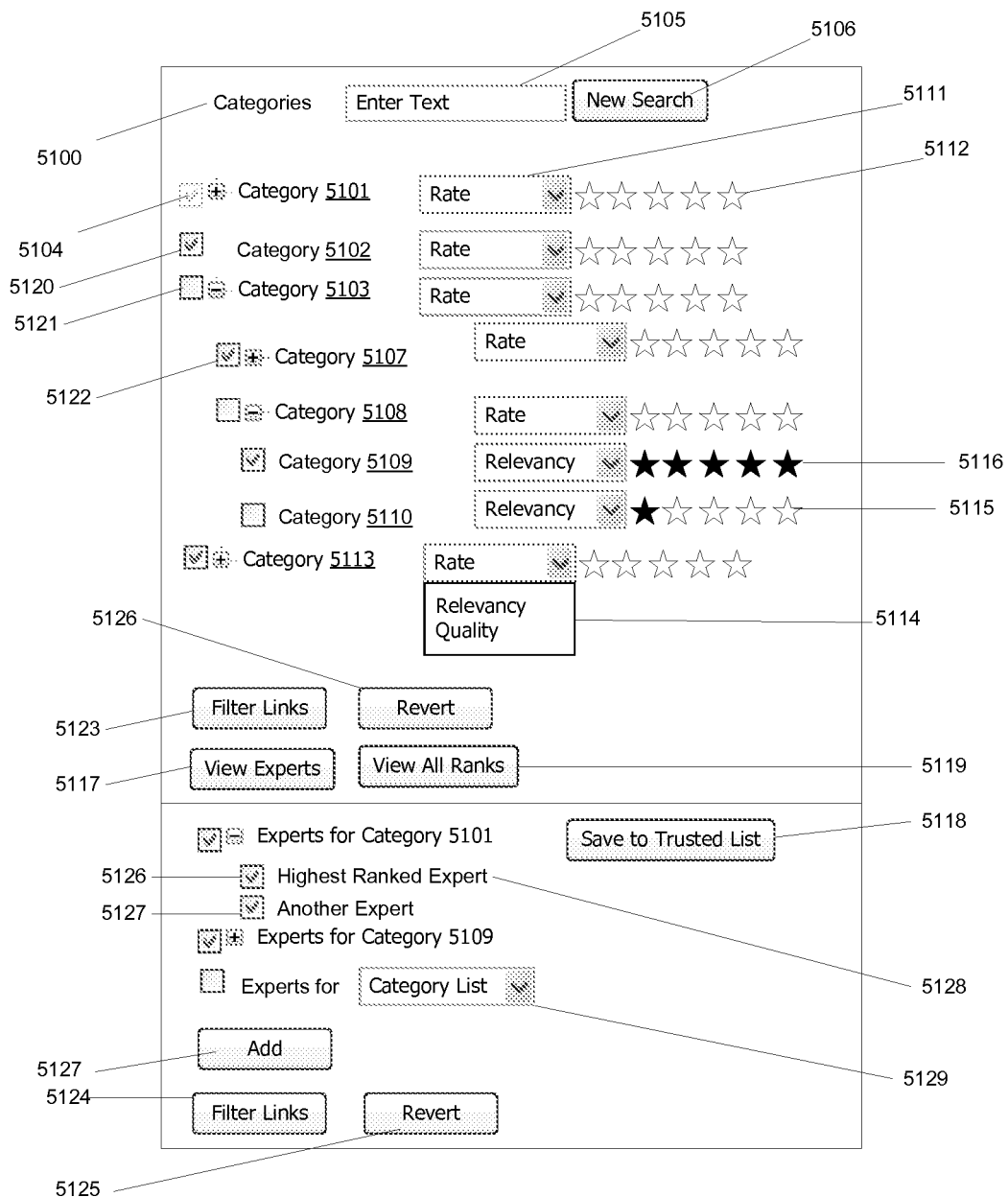
Figure 5C:
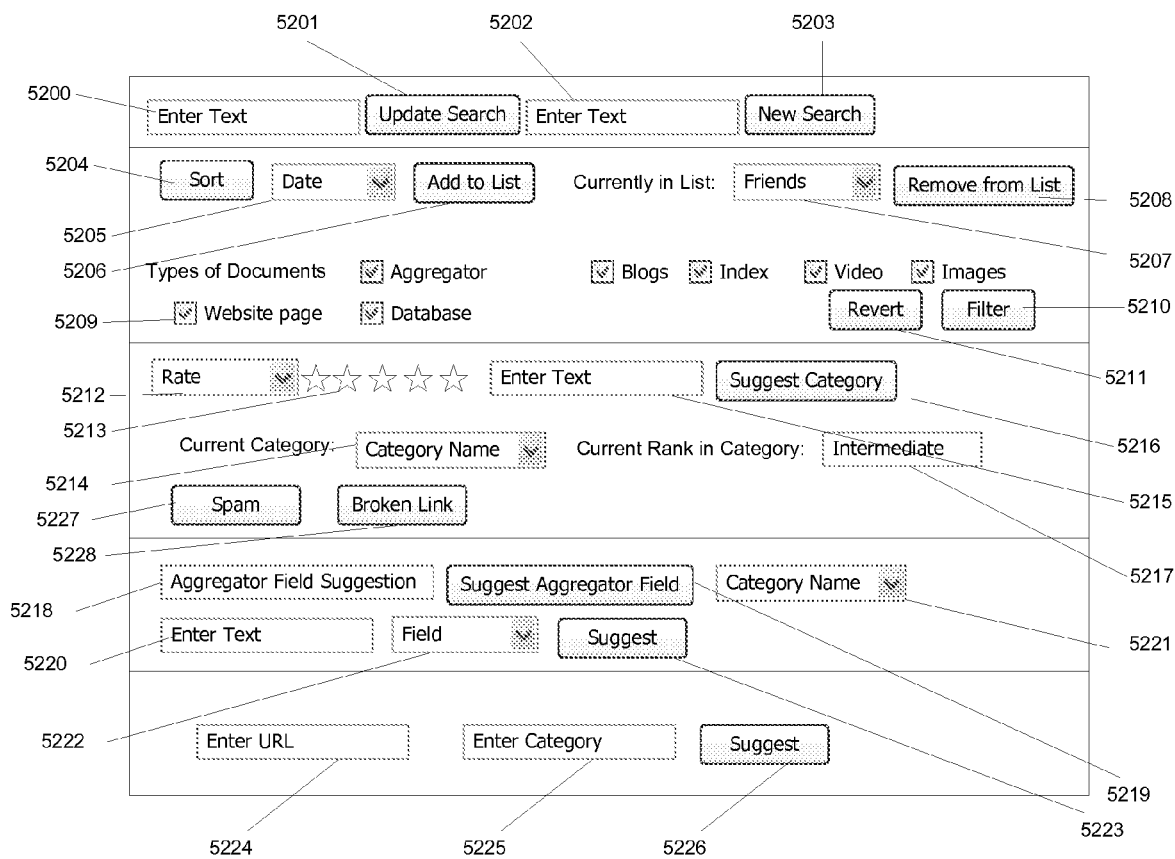

FIG. 5b illustrates an example interface for displaying categories related to a search query, according to the example embodiment of FIG. 5a. A headline 5100 may indicate that the frame is related to categories of the search query. A user may enter text in a text box 5105 and press a "new search" button 5106 for a list of category names. There may be multiple categories listed that relate to a search. Some categories may be standalone, such as category 5102, and others may be a part of a hierarchy, such as the example categories 5101, 5103, 5107, 5108, 5109, 5110, and 5113. The categories that are part of a hierarchy may be allowed to expand, for example, category 5103 may have sub-categories 5107 and 5108, and sub-category 5108 may have sub-categories 5109 and 5110. Each of the categories may have checkboxes, though some may be inactive 5104. Inactive checkboxes may indicate that it is the primary category and that un-checking the category would result in a very poor search result and the user may be better served entering a new search. The default display may be to have all the suggested categories as checked. The categories displayed may be similar to the main category 5101 but may simply not be consolidated because it is relatively new or because the similarity score is not high enough. A user may keep checkboxes selected 5120 or may unselect a checkbox 5121 which may dynamically and automatically update search results in a results page. Unselecting a top category, such as category 5103 may automatically unselect all the categories in a lower hierarchy, such as category 5108 and 5110, and a user may then individually select 5122 categories to include, such as category 5107 and category 5109.

A user may rate the relationship of a category to the search query terms using a rating system 5112. A drop-down box 5111 may let a user choose how to rate, either on relevancy or quality 5114, as shown when the drop-down box is displayed. A user may rate by relevancy and indicate the rating by filling in a start as in 5115, or give a high rating 5116. These in turn may be used to score the relationship of the search terms as tags for the categories listed, or possibly for the relationship between the categories themselves. For users of a higher rank in that category, the search term rating may count as a higher vote for those terms as tags than a lower ranked user for that category.

A "Filter Links" button 5123 may be used if the results page is set not to dynamically update as checkboxes are selected or unselected. In such a scenario, the new results page would only be filtered of the unselected categories and the results page updated when the "filter links" button is depressed. A "Revert" button 5126 may be used if the user determines that the results after a "filter links" returned poor results and the user wanted to return to the previous result before the "filter links" was used. The reversion to the previous search result may also automatically re-select or un-select the categories back to the original settings before the last filter or result page was presented.

A "View Experts" button 5117 may display experts in a separate frame below and a "View All Ranks" button 5119 may display all the ranks of users. The experts or all ranks displayed may be those related to each of the selected categories. The user may add experts from different categories using the add button 5127 after a user chooses the category from a list in a drop down box 5129. Individual users that are listed 5126 and 5127 may be saved to a "Trusted List" 5118, which a user may later use to sort or index a results page by. For example, having a user in a trusted list may boost the weight of that particular user's vote when assigning a score to the reference anchor, such as the category, document, tag, etc. After a user selects certain experts for categories to trust, instead of saving them to a trusted user list, a user may instead filter the links 5124 by those experts' ratings. Similar to above, a user may revert 5125 the last filtering action if he wants to backtrack from the re-indexing.

FIG. 5c illustrates an example interface of a menu frame for manipulating search results and contributing reference anchors, according to the example embodiment of FIG. 5a. On the top frame illustrates a menu frame that allows a user to alter the results page by entering text 5200 for an updated search 5201, or entering text 5202 for a new search 5203. If the user is updating a search 5201, the user is taking the results that are already returned and narrowing the returned results by the updated search terms. If the user has a new search 5201, the returned results are absolutely new and not related to the old search.

The next frame illustrates a sorting ability as well as a re-indexing ability to provide different weights based on different factors. A sort button 5204 and a drop down box 5205 of different sorting methods allows a user to sort by any number of factors, for example, by Date, Level (e.g. Expert, Intermediate, Novice, other available, etc.), Trusted Users, Friends, etc., or a combination thereof. For example, sorting by date allows a user to sort by the date that a reference anchor was submitted or by the date or time that there was activity regarding the reference, such as last voted on, last retrieved, etc. These features may be set by a user or administrator. In addition, more than one factor may be selected that will provide weight to selections. In order to have a combination of sorting factors, a user may select the "Add to List" feature which adds a sorting method to a drop down box 5207. A user may thereafter remove some of the factors from the list by selecting the "Remove from List" button 5208. When a user adds or removes a factor from the list, the user may alter the weight of a particular factor from the search results. For example, if a user sorts by "Novice" and "Trusted Users", who were the users that the first user added to his trusted list, then the votes of trusted users and the votes of users when they were in the novice rank, would have more weight, however it may be determined by the system administrator, than the other factors that are normally attributed to the score. The system may even allow a user to determine the amount of weight, by having a rank of the sorting factors. For example, factors that are added to the list first have more weight than those added later. These factors and the influence of these factors may be adjustable by an administrator.

The next frame illustrates a selection of the types of documents that a result page may display. For example, checkboxes 5209, or any other selection method, may be used to select or unselect document types that may be displayed in a search results page that may be available in another frame. A user may select a filter button 5210 after the various document types are selected, or it is possible that the system may dynamically alter the results page as the document types are selected or unselected. A revert button 5211 option may also be available to re-select or unselect the buttons and revert the result page back to the most recent result.

The next frame illustrates a menu for contributing reference anchors. A drop down box 5212 allows a user to choose the type of rating, and stars 5213 allows a user to rate the current page that is being viewed. This frame is provided for the convenience of the user so that he can vote for the document as he is looking at a retrieved document, rather than having to return to the search result page to vote. When a user is viewing a specific document that has been retrieved from a link of a particular search result, a user may make a rating for that document pertaining to a category. The default category listed may be the most related category 5214 as determined by the search query and as returned by the result page. The category may be listed in a drop down box 5214, and if the user is currently ranked within that category, the rank may also be displayed 5217. The user may change the associating category for which a rating may be made for a particular document, and if the user is ranked in the other category, then the user's rank for that category may be dynamically displayed. The categories listed in the drop down box 5214 may be the same related categories that may be listed in a frame like that of FIG. 5b. If in the category drop down box 5214 the category that the user believes a retrieved document is most closely related does not exist, the user may enter the name of the category in a text box 5215 and select a "suggest category" 5216 button. The "suggest category" button 5216 may bring up a suggestion window, as will be explained in more detail in FIG. 5d.

Instead of having low ratings for some types of pages, the frame may also contain a spam button 5227 or a broken link button 5228. A spam button 5227 may be used for pages that are either documents or websites with pure ads, for example, websites that are reached when a user mistypes the URL of an intended page, or websites that are "legitimate" but are intended purely to serve ads or are "under construction" and have very little other purpose. A broken link button 5228 may be used when a website has a broken link, for example, when a user tries to reach a website from a URL or other link and fails to return the page. These buttons may be preferred instead of a poor rating 5213 specifically for spam pages or broken links because a spam page or broken link may soon thereafter become a legitimate website or reference. In such a scenario, if a server is re-indexing pages or crawling for pages and detects that what was previously a broken link or spam website has legitimate content, the server may determine if the page was rated poorly because it was truly unrelated to a category or rather because at a previous time the page had minimal content because, for example, it was under construction or the owner of the domain had not had the opportunity yet to fill the website with content. Or, in the example scenario of a broken link, it may be possible that a link is broken because of a poor connection of a user, if a particular website had a denial of service attack and was temporarily down, or because a website may have higher traffic than usual and as a result was temporarily unavailable. If a website is flagged by a broken link or spam site, then the server may check the site more frequently for new content or to determine if the server is only temporarily down, or the server itself may determine its connection or provide administrators or expert users to have the final rating or decision as to whether a page should be designated as spam or broken for a longer term. If the site is checked to see whether it is spam or a broken link, then it would not affect the actual rating.

The next frame illustrates a menu for creating an aggregator or filling in an aggregator. As explained before, an aggregator may be a dynamic database that is created as users suggest fields to search within a category and as users contribute information to fill in those fields. The information contributed may be used later as advanced search terms. For example, if a category "restaurants" had a suggested field of "hours", for a specific document of a webpage, another user may fill in the term "9 am to 12 am" in the "hours" field for that document. When another user searched under the field of "hours" and used the term "10 pm", the search result would capture the document. When a user is viewing either a search result page or has pulled a specific document from the search results page, a user may suggest an aggregator field in a text box 5218 and submit the suggestion 5219. The suggested aggregator may be for the default category of the search result page, or whichever category is chosen from a drop-down box 5221. If a user has retrieved a specific page, a user may submit information in a text box 5220 and specify a field from a drop-down box 5222 and submit the information 5223.

The next frame illustrates a menu for suggesting documents. A text box may receive a URL suggestion 5224 and another text box may receive a category suggestion 5225. The user may then submit 5226 the suggestions. If the category 5225 is not filled in, the system may automatically associate the URL by parsing the text. Or, the system may search for the URL in other categories and associate the document with the most relevant category.

Figure 5D:
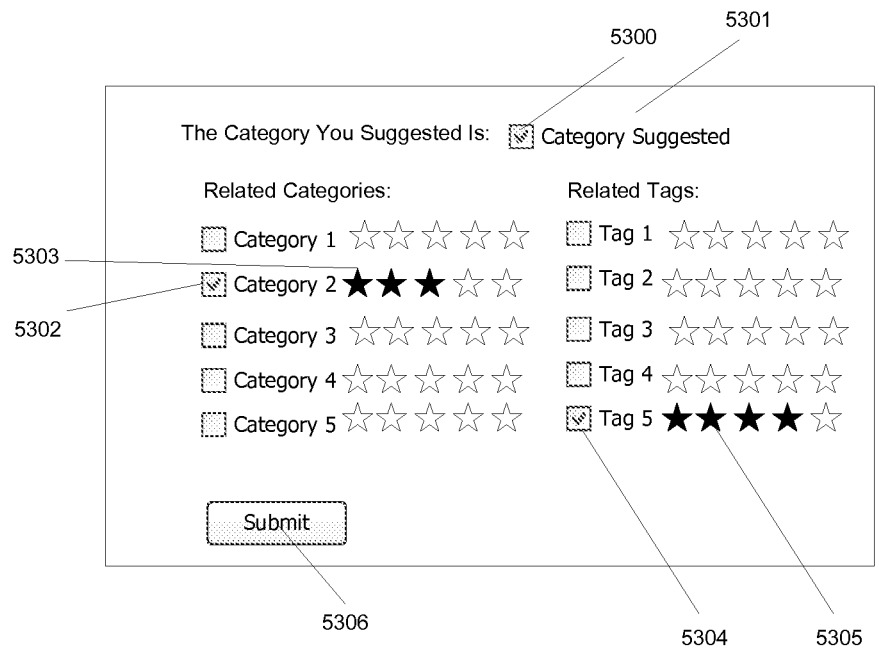

FIG. 5d illustrates an example interface of a menu frame for suggesting a category and contributing reference anchors, according to the example embodiment of FIG. 5a. The category suggestion frame may be displayed as a pop-up window or in a separate frame. The category that was suggested by the user may be displayed 5301 with the user having the option to unselect 5300 the category and possibly pick a related category instead. The related categories may be selected using a checkbox, such as 5302. If the related category is selected 5302, the user may also rate 5303 the extent of the relationship. In the example, the selected category 5302 is rated three out of five stars. If the suggested category 5301 is unselected, then the remaining selected category or the highest rated related category may replace the original suggested category 5301. A group of suggested tags may also be displayed and a user may select 5304 and rate 5305 the tags in relation to the suggested category. After the user has selected the various categories, tags, and ratings, the user may submit 5306 his selections.

Figure 5E:
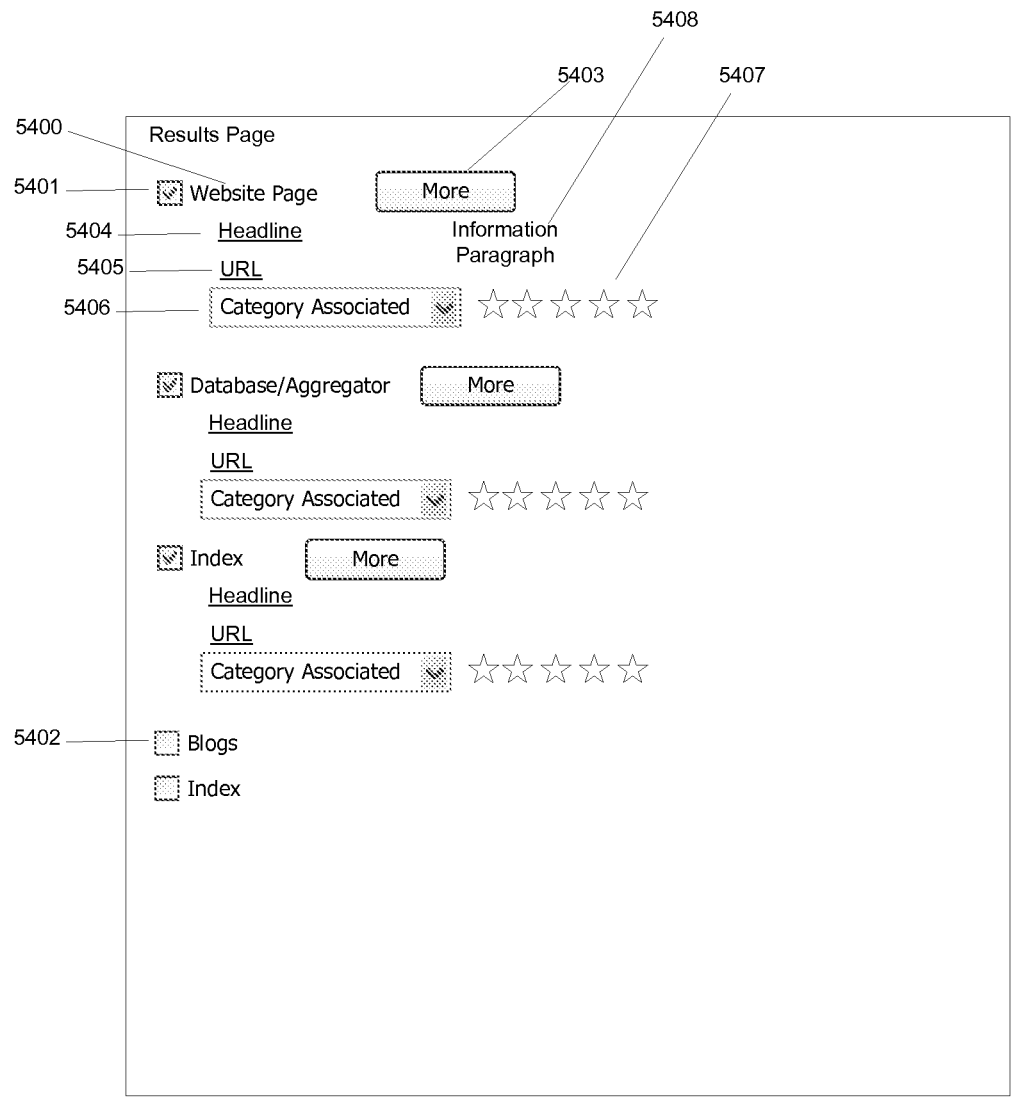

FIG. 5e illustrates an example interface of a frame for displaying a search results page, according to the example embodiment of FIG. 5a. The results page may contain headers 5400, such as "Website Page" that indicate the document types listed. A user may leave the checkbox selected 5401 to keep the links to those references listed, or the user may unselect 5402 a checkbox in order to not have any more links shown for that document type. The result page may only preliminarily list a few links for each document type that is selected. A user may select a "more" button 5403 in order to have the results page list more. These settings may also be altered by the user to determine the initial number of links listed in a search result page.

For each link the result page may display a headline 5404, a URL or other link access 5405, a drop down box listing which category the reference is most closely related in relation to the search terms 5406, the rating that may be made for the relevance of the document to the category 5407, and information 5408 relating to the document. Headline 5404 may have been taken from the document or suggested by users. The 5406 may be associated with the categories suggested on another frame, such as in FIG. 5b, or they may be generated independently and list all possible categories that the document is associated with even if it is not related to the search terms used to generate the result page. Information 5408 that may be provided are search terms highlighted from excerpts of the document, information or notes regarding the document made by other users, statistical information regarding the rank of the user and its general relevancy, etc.

Several example embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of maintaining a user-interactive system, wherein the system is for dynamically providing a plurality of references, comprising:
    identifying a plurality of documents;
    parsing the plurality of documents;
    indexing the plurality of documents;
    assigning a document score to each of a plurality of documents based on at least a rating provided by a user, wherein the document score is stored in memory;
    assigning a user score to each of a plurality of users based on the document score, wherein the user score is stored in memory and the user score is corresponding to the respective user; and
    re-assigning a document score to each of a plurality of documents based on at least a changed rating of the user score.

2. The method of maintaining a user-interactive system, wherein the system is for dynamically providing a plurality of references according to claim 1, further comprising assigning a third score for the indexing of the plurality of documents.

3. The method of maintaining a user-interactive system, wherein the system is for dynamically providing a plurality of references according to claim 2, further comprising assigning a score to the plurality of documents, by outputting the score into memory, based on the document score and third score.

4. The method of maintaining a user-interactive system, wherein the system is for dynamically providing a plurality of references according to claim 1, further comprising indexing the plurality of documents based on at least the document score, wherein the indexing is within a plurality of categories.

5. The method of maintaining a user-interactive system, wherein the system is for dynamically providing a plurality of references according to claim 1, further comprising re-indexing the plurality of documents within a plurality of categories.

6. The method of maintaining a user-interactive system, wherein the system is for dynamically providing a plurality of references according to claim 1, wherein the rating provided by the user is weighted based on a user score.

7. The method of maintaining a user-interactive system, wherein the system is for dynamically providing a plurality of references according to claim 1, wherein the rating provided by the user is weighted based on a user's rank within a category.

8. The method of maintaining a user-interactive system, wherein the system is for dynamically providing a plurality of references according to claim 1, wherein the user score of a specific user is within a category.

9. The method of maintaining a user-interactive system, wherein the system is for dynamically providing a plurality of references according to claim 1, further comprising receiving a reference anchor from a user and dynamically altering the score of the user based on a score of the reference anchor.

10. The method of maintaining a user-interactive system, wherein the system is for dynamically providing a plurality of references according to claim 1, further comprising recursively propagating the assignment of scores, for at least two or more cycles, to the plurality of users and documents.

11. The method of maintaining a user-interactive system, wherein the system is for dynamically providing a plurality of references according to claim 1, wherein the reference anchor is at least one of a document submitted by a user, a relevance vote of a document submitted by a user, a quality vote of a document submitted by a user, the submission of the document by a second user, a creation of a category, a cross-reference to a category, or the tagging of a category.

12. The method of maintaining a user-interactive system, wherein the system is for dynamically providing a plurality of references according to claim 1, determining the categories of a search query and dynamically populating a category with documents and displaying the documents, wherein the order of the display is based on the score of the documents.

13. A non-transitory, computer readable storage medium containing instructions that when executed result in a performance of a method comprising:
    identifying a plurality of documents;
    parsing the plurality of documents;
    indexing the plurality of documents;
    assigning a document score to each of a plurality of documents based on at least a rating provided by a user, wherein the document score is stored in memory;
    assigning a user score to each of a plurality of users based on the document score, wherein the user score is stored in memory and the user score is corresponding to the respective user; and
    re-assigning a document score to each of a plurality of documents based on at least a changed rating of the user score.

14. The non-transitory, computer readable storage medium containing instructions that when executed result in a performance of a method of claim 13, further comprising outputting the display of a plurality of reference anchors in response to a user request.

15. The non-transitory, computer readable storage medium containing instructions that when executed result in a performance of a method of claim 13, further comprising outputting the display of associated ratings of a reference anchor in response to a user request.

16. The non-transitory, computer readable storage medium containing instructions that when executed result in a performance of a method of claim 13, wherein, for two or more iterations, recursively evaluating the impact of the user scores of the plurality of users alters the document score to reference anchors provided by the plurality of users.

17. The non-transitory, computer readable storage medium containing instructions that when executed result in a performance of a method of claim 16, wherein the reference anchors are re-indexed after the new first scores are propagated.

18. A user-interactive system comprising:
   a processor;
   a memory unit;
   an arrangement, executed by the processor, identifying a plurality of documents;
   an arrangement, executed by the processor, parsing the plurality of documents;
   an arrangement, executed by the processor, indexing the plurality of documents;
   an arrangement, executed by the processor, assigning a document score to each of a plurality of documents based on at least a rating provided by a user, wherein the document score is stored in memory;
   an arrangement, executed by the processor, assigning a user score to each of a plurality of users based on the document score, wherein the user score is stored in memory and the user score is corresponding to the respective user; and
   an arrangement, executed by the processor, re-assigning a document score, and storing the score in the memory unit, to each of a plurality of documents based on at least a changed rating of the user score.

19. The method of maintaining a user-interactive system, wherein the system is for dynamically providing a plurality of references according to claim 1, further comprising re-assigning a document score to each of a plurality of documents related to a user based on the re-assigned user score.

20. The method of maintaining a user-interactive system, wherein the system is for dynamically providing a plurality of references according to claim 1, further comprising re-assigning a user score to each of a plurality of users based on at least the re-assigned rating of the document score.

* * * * *